United States Patent
Tessier et al.

(10) Patent No.: US 7,199,497 B2
(45) Date of Patent: Apr. 3, 2007

(54) FRAMELESS SWITCHED RELUCTANCE MOTOR AND APPLICATION AS A TOP DRIVE FOR A ROTARY PUMP

(75) Inventors: Lynn P. Tessier, Cochrane (CA); John P. Doyle, Calgary (CA); James L. Weber, Calgary (CA)

(73) Assignee: MSI Machineering Solutions Inc., Providenciales (TC)

( * ) Notice: Subject to any disclaimer, the term of this patent is extended or adjusted under 35 U.S.C. 154(b) by 0 days.

(21) Appl. No.: 11/160,009

(22) Filed: Jun. 6, 2005

(65) Prior Publication Data

US 2005/0269889 A1  Dec. 8, 2005

Related U.S. Application Data

(60) Provisional application No. 60/576,577, filed on Jun. 4, 2004.

(51) Int. Cl.
 *H02K 7/00* (2006.01)
 *H02K 5/04* (2006.01)

(52) U.S. Cl. .................. 310/90; 310/58; 310/87; 417/424.1; 166/66.4

(58) Field of Classification Search .................. 310/87, 310/90; 417/424.1; 166/104
 See application file for complete search history.

(56) References Cited

U.S. PATENT DOCUMENTS

| | | | |
|---|---|---|---|
| 5,035,043 A * | 7/1991 | Newberg | 29/596 |
| 5,068,556 A | 11/1991 | Lykes et al. | |
| 5,168,188 A * | 12/1992 | Yamamoto et al. | 310/104 |
| 5,237,228 A * | 8/1993 | Fries | 310/87 |
| 5,489,810 A | 2/1996 | Ferreira et al. | |
| 5,674,057 A * | 10/1997 | Guardiani et al. | 417/423.3 |
| 5,765,950 A * | 6/1998 | Eno et al. | 384/97 |
| 6,206,097 B1 * | 3/2001 | Stephens | 166/112 |
| 6,700,255 B1 * | 3/2004 | Stenta | 310/90 |
| 6,759,774 B1 * | 7/2004 | Griggs | 310/87 |
| 2004/0027011 A1 * | 2/2004 | Bostwick | 310/58 |
| 2005/0174007 A1 * | 8/2005 | McClelland et al. | 310/216 |

FOREIGN PATENT DOCUMENTS

| | | |
|---|---|---|
| CA | 2270017 | 10/2000 |
| EP | 1 333 561 | 8/2003 |
| WO | WO 04/023628 | 3/2004 |

* cited by examiner

*Primary Examiner*—Burton Mullins
(74) *Attorney, Agent, or Firm*—Sean W Goodwin

(57) ABSTRACT

A frameless switched reluctance motor (SRM) has a stator sandwiched between two housings. Axial load on the rotor shaft is directed through a first bearing, through the first housing to the stator and through the second housing to a motor support. Heat is dissipated using low-loss electrical steel, one or more air movers and air passages through the motor. Preferably a stator profile enables the air passages to be formed through the stator's lamination stack. Optionally air is routed through passages between the coils and through air passages along the air gap and radially through passages between an upper and a lower stator. A first self aligning bearing adapts to misalignment between the first housing and the shaft and a second bearing is provided with transverse movement. Preferably, the frameless motor is adapted for support to a wellhead for driving a downhole rotary pump and a rotary rod string.

22 Claims, 28 Drawing Sheets

FRAMELESS SWITCHED RELUCTANCE MOTOR AND APPLICATION AS A TOP DRIVE FOR A ROTARY PUMP

CROSS REFERENCE TO RELATED APPLICATION

This application is a regular application claiming priority of U.S. Provisional Patent application Ser. No. 60/576,577 filed Jun. 4, 2004.

FIELD OF THE INVENTION

The invention related to a switched reluctance motor, and the design thereof, which is adapted for supportably rotating a rod string which in turn drives a progressive cavity pump.

BACKGROUND OF THE INVENTION

A progressive cavity ("PC") pump is located in a well and is used to pump subterranean fluids to the surface. Well over 12,000 oil wells in Canada use PC pumps. Conventionally the PC pump is driven from a speed-reducing drivehead or top drive located at the surface. A long assembly or string of rods transmit the slow rotation from the top drive down the well to the PC pump. The top end of the rod string is fitted with a polish rod which is driven through a rod clamp which is driven by the top drive.

The conventional rod string rotational speed of 30–700 rpm is adjusted according to the downhole pumping conditions including the oil characteristics. Lower rotational speeds are not currently practiced due to the large gear reduction required and lack of flexibility to attain greater speeds as pumping conditions improve. Under certain conditions, such as in the case of very viscous oils or low formation influx rates, it desirable to have even lower rotational speeds. These cases are not adequately served with the prior art top drives.

When driven, the rod string winds up in torsion like a rubber band. In a 3,000 foot long rod string, the rods could be wound over 100 revolutions. When the top drive ceases to drive the rod string and coupled PC pump (such as during a power failure), the rods try to unwind, spinning the conventional drive and motor backwards, called backspin. If unrestrained, backspin speed of the rods can reach upwards of 5,000 rpm and, in combination with gear reduction to the top drive (now acting as a speed increaser), the resulting speed at the top drive and motor can dangerously destructive—with most injuries being caused by sheave self-destruction.

Apparatus is known to control backspin. Some top drives have braking systems which are activated upon backspin, either when the drive shuts down or the rod string physically begins to spins backwards. Substantially all modern top drive are fitted with some sort of device which deals with backspin.

Older top drives utilize centripetally-actuated mechanical drum-breaking systems. Alternately a hydraulic pump can cause brake pads to engage a disc-braking rotor on the polish rod. Braking shoes, drums, shoes, pads and discs are subject to wear and the possibility of localized hot spots which can be an ignition hazard.

Some top drives are hydraulic motor driven. Upon backspin the drive naturally reverts to a pump. Hydraulic fluid is directed through a restriction orifice or check valve for releasing pressure. Similarly, in motor-driven gear boxes, a clutch activates on backspin to engage a separate hydraulic pump. At the high torque of backspin conditions, the hydraulic fluid can become very hot, or if the fluid is lost, backspin control is also lost.

In another instance, it is known to provide an AC drive motor with an inline shaft. A Variable Frequency Drive or VFD manipulates line AC/DC and then DC back to a braking. Slip associated with AC induction motor unfortunately limits the motor's ability to reach the low rotational speeds desired in some circumstances, such as with high viscosity oils. Low rotational speeds can result in motor overheating.

Further, to start an AC induction motor under load can result in in-rush amperage as much as 5 or 6 times the normal full load operating current. For instance, for a typical 50 Hp NEMA B motor having a full load current of about 200 A, the in-rush could be 1000–1200 amperes. While this is only for a short period of time and is an accepted disadvantage of AC motors, there is a further economic impact. Often, the peak current use of an end user is identified by the utility provider as the basis for setting the per unit charge for all power consumption. Accordingly, even though steady-state use may be only 200 amperes, the price paid for the electricity could be based on a higher, albeit momentary, electrical current use.

Thus, there is a need for a more versatile top drive which is capable of a wide range of operating speeds, particularly low rotational speeds and is does not suffer the enumerated backspin disadvantages of the gear-reduced apparatus.

SUMMARY OF THE INVENTION

Simply, a switched reluctance motor (SRM) is provided as a top drive for a downhole rotary pump. For top drive operations, a typical range of speeds is between 30 and 700 rpm. The embodiments described herein provide high torque with low rpm output yet avoid the use of gear or belt-reduction. This is achieved by combining the switched reluctance motor and a concentric hollow drive shaft through which the rod string's polish rod extends. Further, should there be an interruption in the motor's power or a rod failure deep in the well, any resulting backspin will not produce a dangerous surface reaction.

In one embodiment, induced heat, which can build up and cause premature failure of conventional SRM technology under such rigorous operating conditions, is effectively dissipated under another embodiment of the improved top drive. In this preferred embodiment, ambient air is circulated from outside the motor, into the motor and across the stator, stator coils and rotor. In one preferred embodiment, the stator is manufactured having a radially extending outer profile, such as a square, the periphery of which is fit with axial air passages. An air mover conducts air axially through the air passages for cooling the stator.

In yet another embodiment, forced air flow is achieved using vanes affixed to the rotating rotor. The flow path of the cooling air is through passages formed through a combination of unique stator and rotor design features. Simplistically, the air is directed upwardly through spaces between adjacent coils wound on adjacent stator poles and through an array of axially-extending (vertical) passages formed in the rotor and in the faces of the stator poles. Air is directed radially past the stator stack and out of the motor. More preferably, the stator stack is formed in two or more sub-stacks of stator laminations. The sub-stacks are spaced axially by a plurality of circumferentially-spaced spacers. The result is a plurality of circumferentially-spaced air discharge passages extending radially from the rotor-stator air gap to a location outside the motor. In the case of two stator sub-stacks, an upper and a lower lamination stack, the rotor is fit with a dividing lamination having a radially protruding barrier, typically formed of laminations of a diameter larger that the axial passages in the rotor, the barrier interrupting the axial passages. Thus, air flowing along the rotor's axially-extending passages is blocked and re-directed radially outwards through the discharge passages. Accordingly, two flow paths are created; a first path flowing upwardly from lower rotor vanes and through the rotor's axially-extending passages to cool the lower lamination stack, coils and rotor, and a second path flowing downwardly from upper rotor vanes and through the rotor's axially-extending passages to cool the upper lamination stack, coils and rotor. Both flows approach the rotor's protruding barrier and are directed out of the motor. Air supplying the second path is obtained from air flowing upwardly between the coils and then is directed downwardly aided by the upper vanes.

In another embodiment, the top drive is conveniently provided as a frameless motor which is secured directly to the wellhead. The polish rod supports the rod string. The polish rod is supported by the hollow drive shaft which is in turn rotatably supported by the motor's frame. Unlike conventional frameless motors in which loads are borne by the driven equipment, the present embodiment bears the loads on the motor itself. Accordingly, the frameless motor is capable of bearing the axial loads imposed through the shaft.

In another embodiment related to the frameless motor, as the nature of the stator stack is that there is some tolerance in stack assembly, the dimension or height of the stack can vary circumferentially. Accordingly, the top plane of the motor stator (perpendicular to shaft) may not reside in the same plane as the bottom plane of the motor stator. Thus bearings rotatably supporting the rotor, particularly under load, are compliance with some misalignment. A combination of bearing arrangements ensures reliable operation. More particularly, a spherical roller thrust bearing is employed at the top plane of the motor which has self-aligning capabilities and is forgiving of misalignment of the shaft relative to the bearing. This spherical bearing rotatably supports the suspended load while accepting some deviation from perpendicular between the shaft and the top plane.

In another embodiment, the top bearing is provided with a dependable supply of lubricant. In the spherical bearing embodiment disclosed, the bearing has a tendency to throw its own lubricating oil radially outward. Thus, an inner annulus area containing lubricating oil within the spherical bearing is placed in communication with an annular oil reservoir radially outward of the spherical bearing. Oil shed radially outwardly by the bearing is collected in the sump of the oil reservoir and directed back through passages below the spherical bearing so as to replenish the inner annular area. Oil is retained in the upper spherical bearing housing using a standpipe sealably secured below the spherical bearing and extending upwardly through the bearing and around the shaft.

Overall, various improvements and additional capabilities are obtained from the SRM top drive of the present invention include:

Concentric Design: The improved top drive places the drive directly over the center of the well, the concentric design eliminating the overhung movement of a cantilever-mounted motor, reducing the stress on the wellhead and eliminating the need for additional support structures;

Torque Control: The improved top drive is a programmable torque machine ensuring that the rod string cannot be overtorqued. In addition, the improved top drive system continuously monitors the torque, enabling detection of a pump-off condition. Advanced control algorithms allow the operator to continuously optimize the well production;

Simple Design: The improved top drive is a direct-drive motor eliminating belts, sheaves, gears and other power-robbing paraphernalia. Also, the simple design drastically reduces the parts count and complexity, thereby increasing reliability and robustness;

Safety: The improved top drive features regenerative braking capacity to safely remove the stored energy in the rod string and fluid column when the unit is shut down, or in the event of a trip or power failure. In the event of a more serious failure which prevents the regenerative braking from functioning, the top drive is designed to tolerate a 5000 RPM overspeed without damage;

Performance:
1,000 foot-pounds of torque from 50 to 500 RPM,
100 HP from 500 RPM to 705 RPM,
40,000 pound-force rod load rating,
20-year bearing life at design load and 500 RPM,
greater than 90% power line to rod string efficiency, and
No in-rush current, low power bills; and
Low Maintenance: The improved top drive concentric design simplifies installation and set-up time. There are no belts to tighten or adjust, only periodic check of the upper bearing oil level and annual re-greasing of the bottom bearing.

DETAILED DESCRIPTION OF THE PREFERRED EMBODIMENT

In one embodiment, an improved switched reluctance motor is provided. In another embodiment, an improved top drive for a rotary pump utilizing the improved switched reluctance motor is provided.

Figure 1:
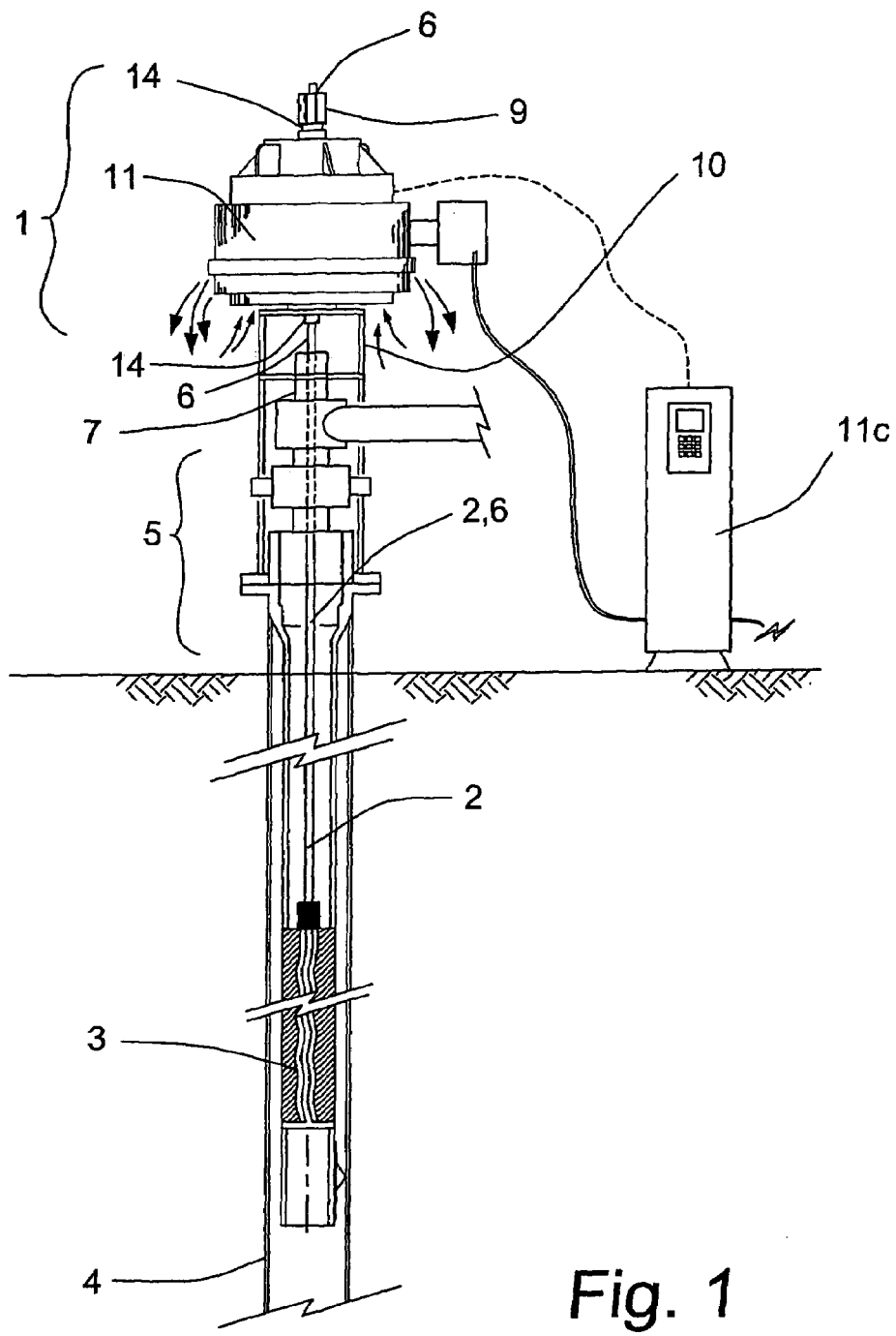
FIG. 1 is cross-sectional view of a well, a rotary pump and a wellhead with a rod string extending therethrough and having a switched reluctance motor top drive mounted above the wellhead.

Having reference to FIG. 1, a top drive 1 is used to rotate the rod string 2 of a rotary pump 3 anchored downhole in a well 4. The well 4 is sealed with a wellhead 5 through which the rod string 2 extends. A polish rod 6 at the upper end of the rod string 2 extends through the wellhead 5 and through a packing 7. The top drive 1 is located above the wellhead 5. The top drive 1 is secured to the wellhead 5 to absorb reaction torque and thus prevent rotation. The top drive 1 is secured to the wellhead 5 to arrest reactive rotation, preferably using a flanged connection (not detailed). A hollow shaft 14 extends through the top drive 1 guiding the polish rod 6 concentrically therethrough.

The polish rod 6 extends through a hollow shaft 14 through the top drive 1. A rod clamp 9, secured to the polish rod 6, bears against the top of the hollow shaft 14 of top drive 1 to suspend itself and the rod string 2 therefrom. Optionally a taper-lock bushing (not shown) locks the hollow shaft 14 to the polish rod 6.

The top drive 1 is usually spaced above the wellhead packing 7 using a housing or frame 10 so as to provide ease of access to the polish rod 6 and packing 7. Accordingly, a length of polish rod 6 is exposed between the wellhead 5 and the top drive 1. The polish rod 6 is shown extending above the top of the top drive 1.

The top drive 1 comprises an embodiment of a switched reluctance motor SRM 11 mounted to the wellhead 5. On one embodiment, the frame 10 comprises the SRM 11 itself in a frameless configuration.

Figure 6:
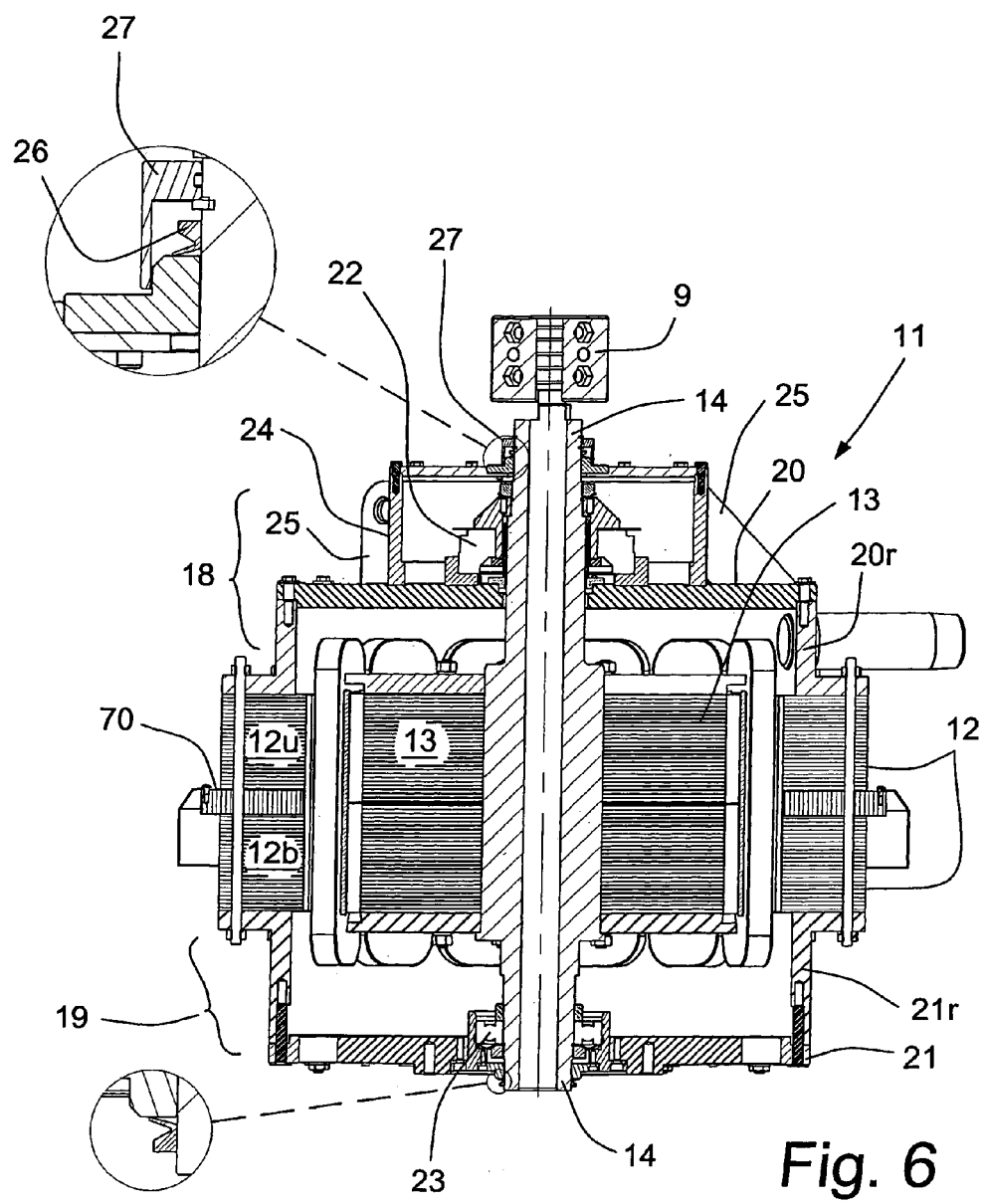
FIG. 6 is a detailed cross-sectional view of the SRM along lines B—B of FIG. 4 with the polish rod removed.
Figure 7:
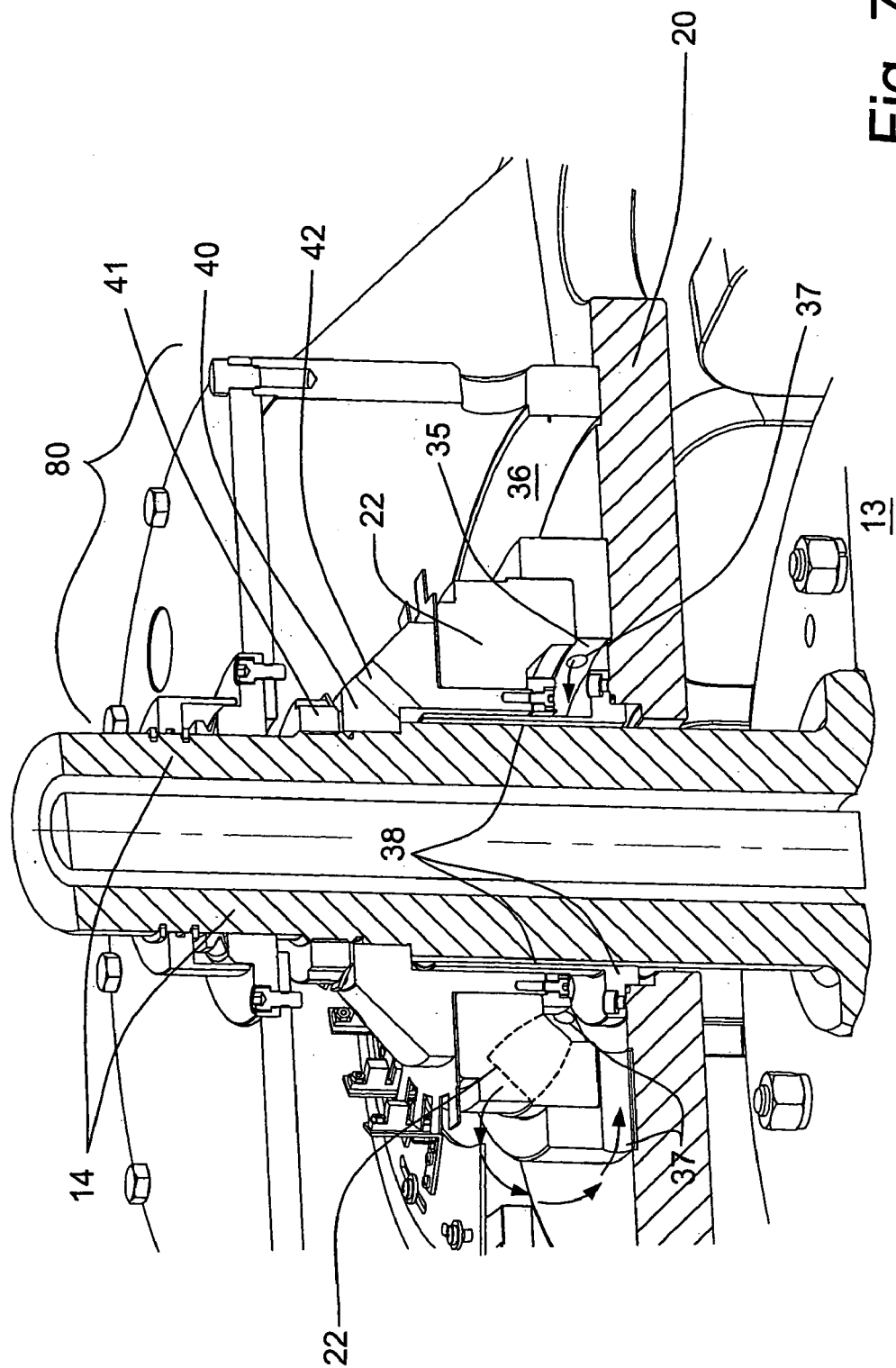
FIG. 7 is a perspective view of the hollow shaft and upper bearing.
Figure 8:
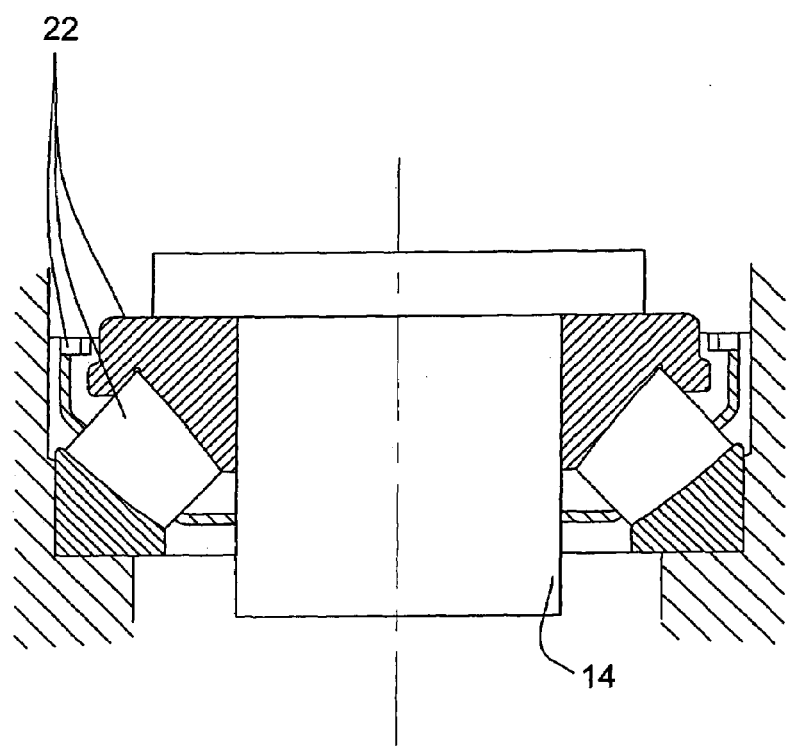
FIG. 8 is a cross-sectional view of a spherical roller bearing embodiment of the upper bearing.

As shown in FIG. 6, the SRM 11 has a stator 12 and a rotor 13. The principles of switched reluctance motors are known to those of ordinary skill in the art. An SRM stator 12 is a laminate stack of electrical steel formed with a plurality of slots wound with coils for forming phase windings—typically three phases are provided. Typically, pairs of diametrically opposing stator poles or sets of poles (12 poles shown as 4 sets of 3 poles) conventionally wired in series for forming each independent phase of the multiphased switched reluctance motor. A nine-pole stator would have 3 sets of 3 poles orientated a 120 degrees. The coils are electronically switched (electronically commutated) in a predetermined sequence so as to form a moving magnetic field. The rotor 13 also forms one or more poles and has no phase windings but has a plurality of teeth which are closely radially spaced by an air gap to the stator poles.

The stator 12 produces a moving magnetic field which induces torque through the teeth of the rotor 13. The rotor rotates to move the teeth inline with the energized stator poles for minimizing the flux path (minimum reluctance). Using predetermined switching of the appropriate stator poles, the desired rotor speed is achieved, as is forward or reverse rotation.

The SRM 11, and hence the top drive 1, produces high starting torque, a relatively flat torque curve and thus is capable of a wide range of operational speeds. Accordingly, the top drive is fully functional and operable at low rotational speeds approaching zero rpm.

Figure 2:
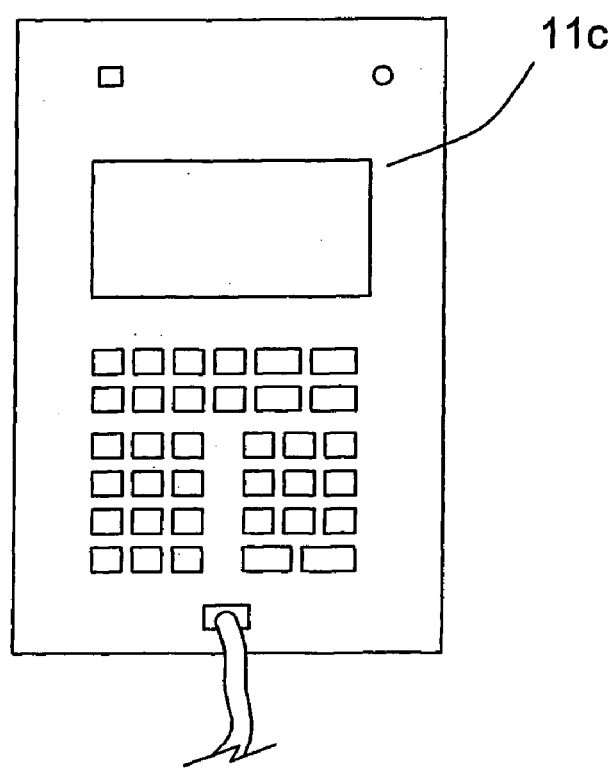
FIG. 2 is a panel for an SRM controller.
Figure 3:
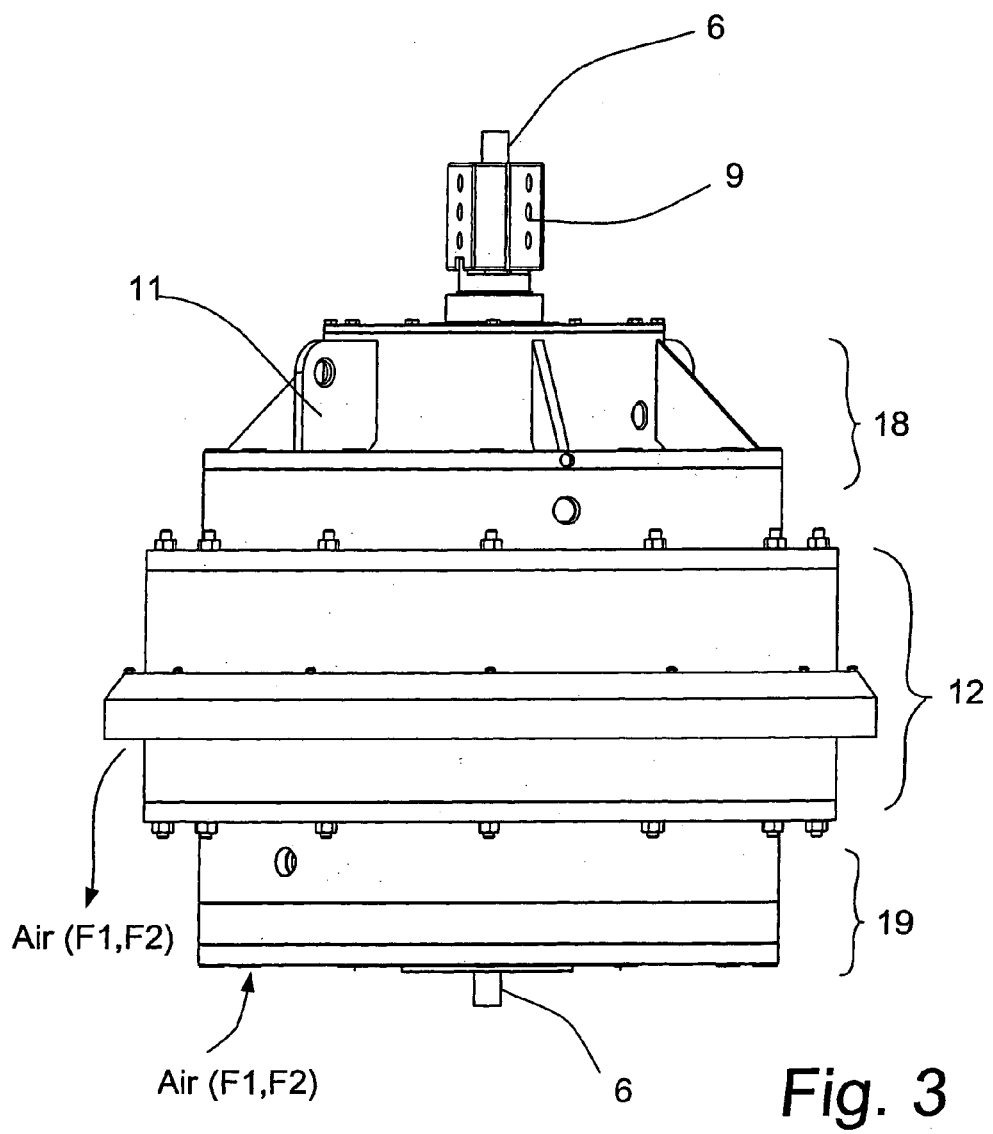
FIG. 3 is a side view of a model of the SRM with a polish rod extending therethrough.
Figure 4:
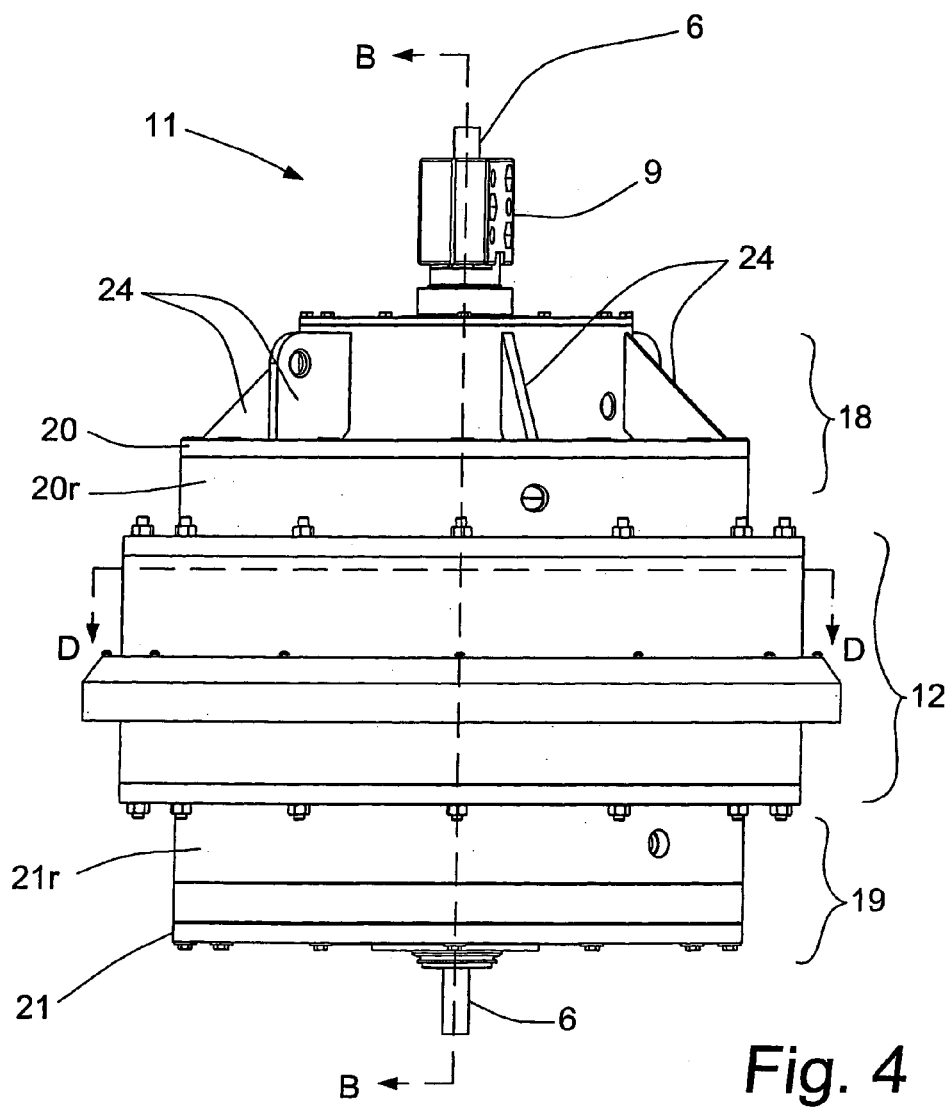
FIG. 4 is a side view of the SRM of FIG. 3 with a polish rod extending therethrough.
Figure 5:
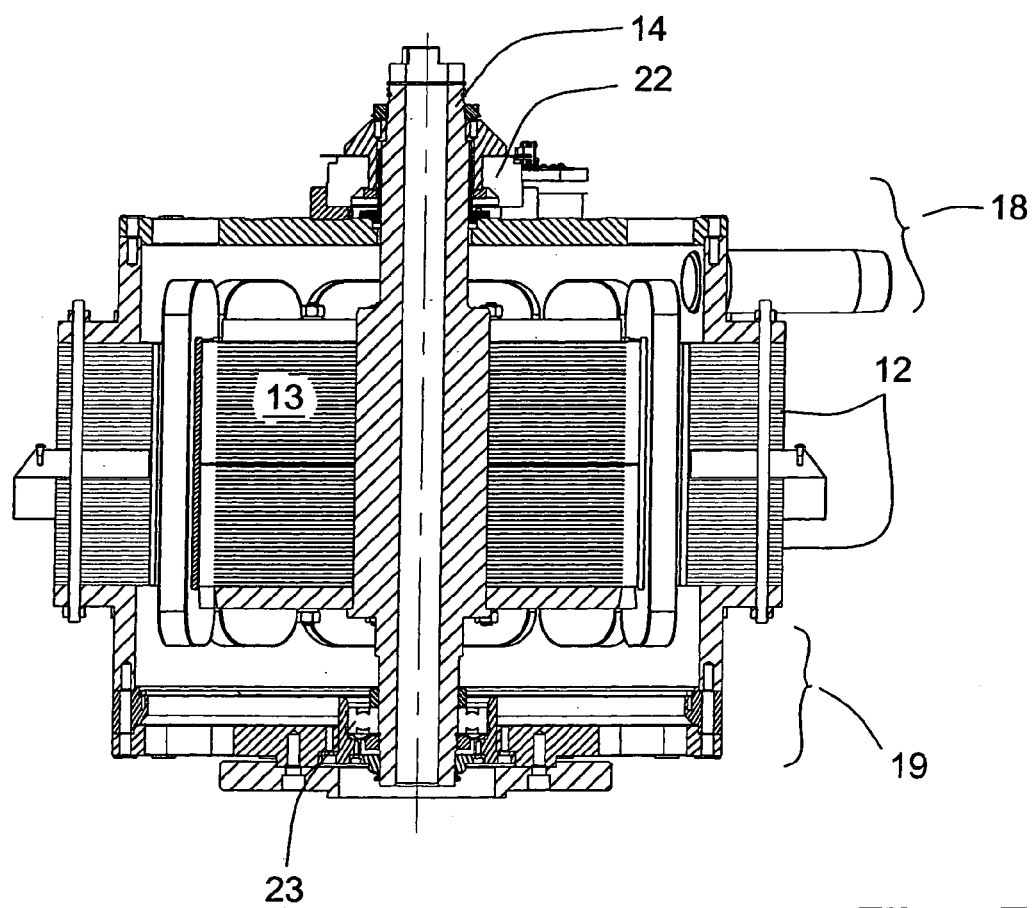
FIG. 5 is a cross-sectional view of the SRM of FIG. 3 with the polish rod removed and illustrating cooling air flow therethrough.

As shown in FIGS. 1 and 2, systems to control the SRM 11 include electronics 11c to control high frequency switching of the stator's poles and means for determining the position of the rotor 12. These controls are known in the industry including those provided by Ideal Electric, USA and Emotron AB, in Sweden.

Frameless Embodiment

As shown in FIGS. 1 and 3–6, generally, in another embodiment, the top drive 1 is conveniently provided as a frameless motor which is secured directly to the wellhead, such as through frame 10 or other connection to the wellhead 5 such as through a flange to the wellhead components. The polish rod 6 supports the rod string 2. The polish rod 6 is supported by the hollow drive shaft 14 which is in turn rotatably supported by the SRM 11. Unlike conventional frameless motors in which loads are borne by the driven equipment, the present embodiment bears the loads on the motor itself.

Accordingly, the SRM 11 is provided in a frameless configuration such as that complying with NEMA C-flange standard dimensions for convenience of mounting and shaft sizes. In other words, the motor stator itself forms the frame for resisting axial loads and reactive torque. The C-flange is mounted to the frame 10 and to the wellhead 5 or the frameless SRM C-flange is secured directly to the wellhead 5 to restrain reactive rotation.

The SRM 11 comprises a structural assembly of the stator 12, an first or upper housing 18 at a first end of the stator's lamination stack and a second or bottom housing 19 at a second end of the stator's lamination stack. Axial loads, in a top drive embodiment being vertical loads for suspending rod string 2 from the hollow shaft 14, are directed or transferred through the upper housing 18, through the stator 12 and through the bottom housing 19 into the wellhead 5.

In typical installations the axial loads can be as high as about 40,000 pounds.

Figure 15:
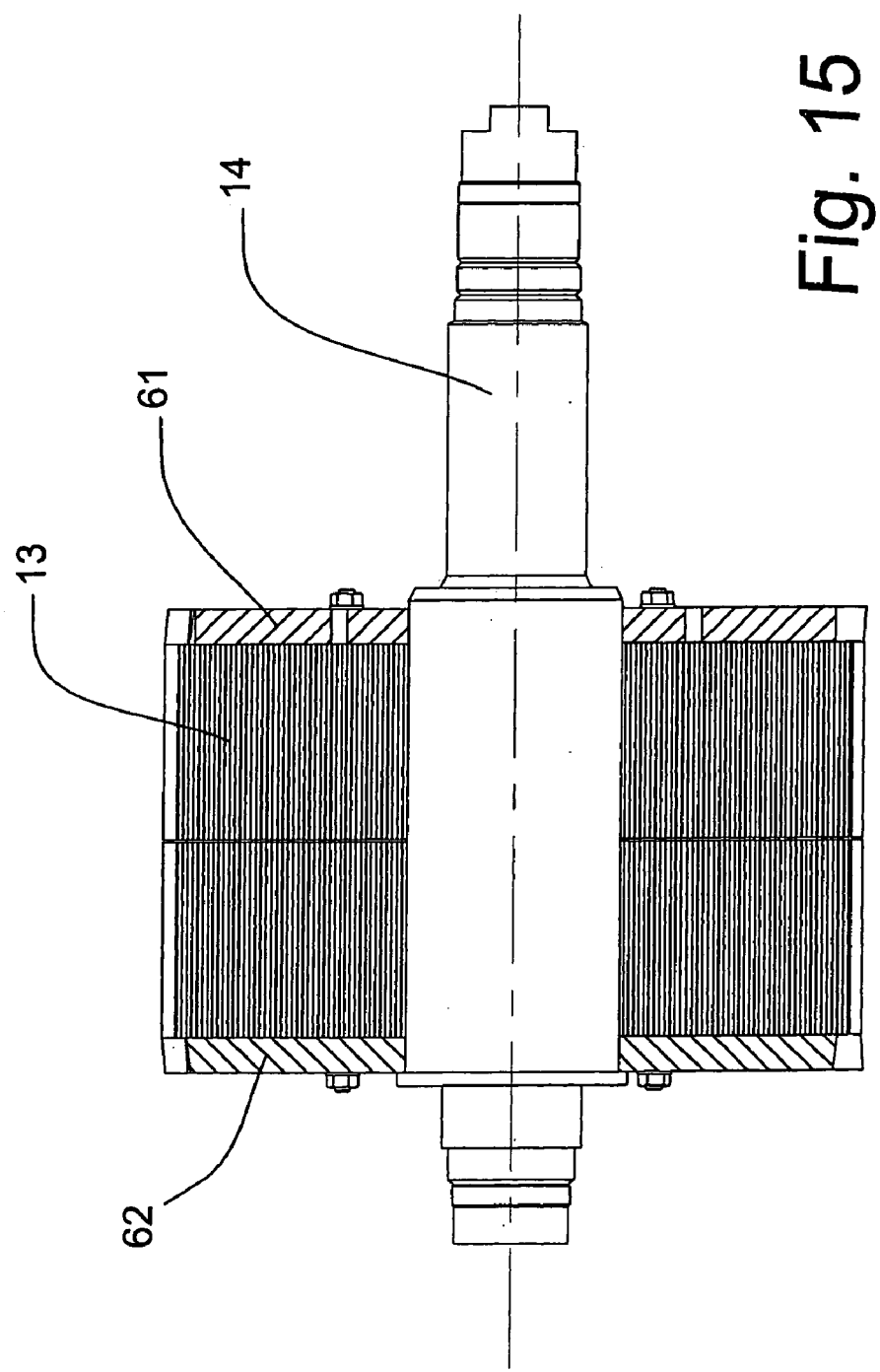
FIG. 15 is a cross-sectional view of the rotor along A—A of FIG. 14a with a side view of the hollow shaft extending therethrough, the axially-extending passages not being shown.
Figure 16:
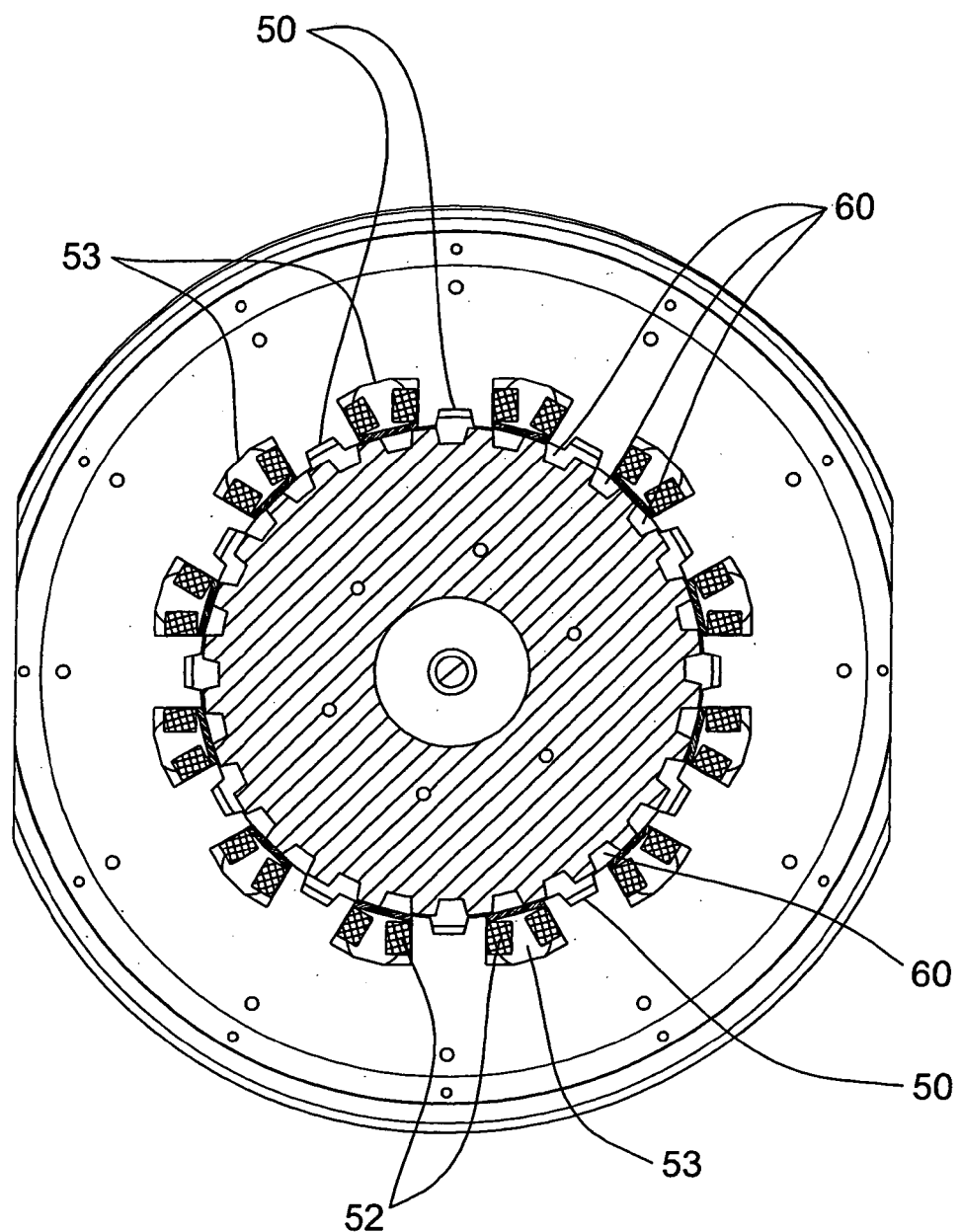
FIG. 16 is a partial cross-sectional view along D-D of FIG. 4 illustrating the rotor inserted through the stator.

The polish rod 6 extends upwardly and out of the top drive's hollow shaft 14. The polish rod clamp 9 secures to the rod 6 above the top drive 1 for preventing the polish rod from passing downwardly through the hollow shaft 14. The clamp 9 and shaft 14 cooperate to enable rotational drive. As shown in FIGS. 6 and 15, a dog and notch arrangement is conventionally employed to enable dogs extending from the shaft 14 to engage notches in the clamp 9 or vice-versa and thereby transmit torque from the SRM shaft 14 to the polish rod 6.

In greater detail and referring to FIGS. 2–24, the SRM 11 comprises a stator 12 having an upper lamination stack 12$u$ and a bottom lamination stack 12$b$. The frameless SRM is achieved by sandwiching the stator 12 between the upper and bottom housings 18,19. The upper housing 18 comprises an upper plate 20 spaced from the stator 12 and supported by a structural member or cylindrical wall from a peripheral first flange or flanged end ring 20$r$ and forming annular space therein. The bottom housing 19 comprises a bottom plate 21 spaced from the stator 12 and supported on a structural member or cylindrical wall from a peripheral first flange or flanged end ring 21$r$.

The hollow shaft 14 supporting the rotor 13 extends axially through the stator 12,12$u$,12$b$ and the upper and bottom plates 20,21.

The shaft 14 is rotationally and axially supported using a first or upper radial thrust bearing 22 supported on the upper plate 20. The shaft 14 is further radially supported with a second or bottom ball bearing 23 supported in the bottom plate 21.

Axial loads from suspending the hollow shaft 14 and rod string 2 are therefore directed or transferred through the upper plate 20, the end ring 20$r$, through the stator 12, through end ring 21$r$, and through the bottom plate into the wellhead 5.

The upper plate 20 is strengthened in part by a bearing housing 24 enclosing the upper radial thrust bearing 22. The bearing housing 24 is further strengthened with gussets 25. The bearing housing 24 is sealed from ambient conditions through a top seal 26 and top seal cover 27.

Shaft Misalignment Compensation

With reference to FIGS. 6–10, and in another embodiment, there is some tolerance in the rotational arrangement which is related to the frameless motor and in particular due to the nature of an SRM stator 12 in which there can be significant variation in the lamination stack assembly of the stator 12. The dimension or height of multiple laminations in the stator stack can vary about the circumference which could be as much as a ¼ inch height variation on a stack of about 12 inches or so. Accordingly, a top plane at the first end of the motor stator 12 (perpendicular to shaft 14) may not reside parallel to a bottom plane of the second end of the motor stator 12. Thus the upper plate 20 and bottom plate 21 supporting the upper and bottom bearings 22,23 can be misaligned. Conventional rigid mounting of the upper and bottom bearings 22,23 could result in misalignment on the shaft axis and bearing axes.

Normally, an axis through the bearings is aligned with the axis of the shaft. Normally, the axis of the shaft is perpendicular to a plane of the upper plate 20. A combination of the bearings and of their mounting arrangements ensures reliable operation and alignment of the respective axes. More particularly, with reference to FIGS. 7 and 8, in a first mounting assembly, the upper bearing 22 is a spherical roller thrust bearing (see FIG. 8) which has self-aligning capabilities and is forgiving of misalignment of the axis of shaft 14 relative to the default axis of the bearing despite a deviation from a perpendicular from the upper plate 20. This spherical bearing 22 rotatably supports the axial load while accepting some deviation from perpendicular between the shaft 14 and the upper plate 20.

Figure 9:
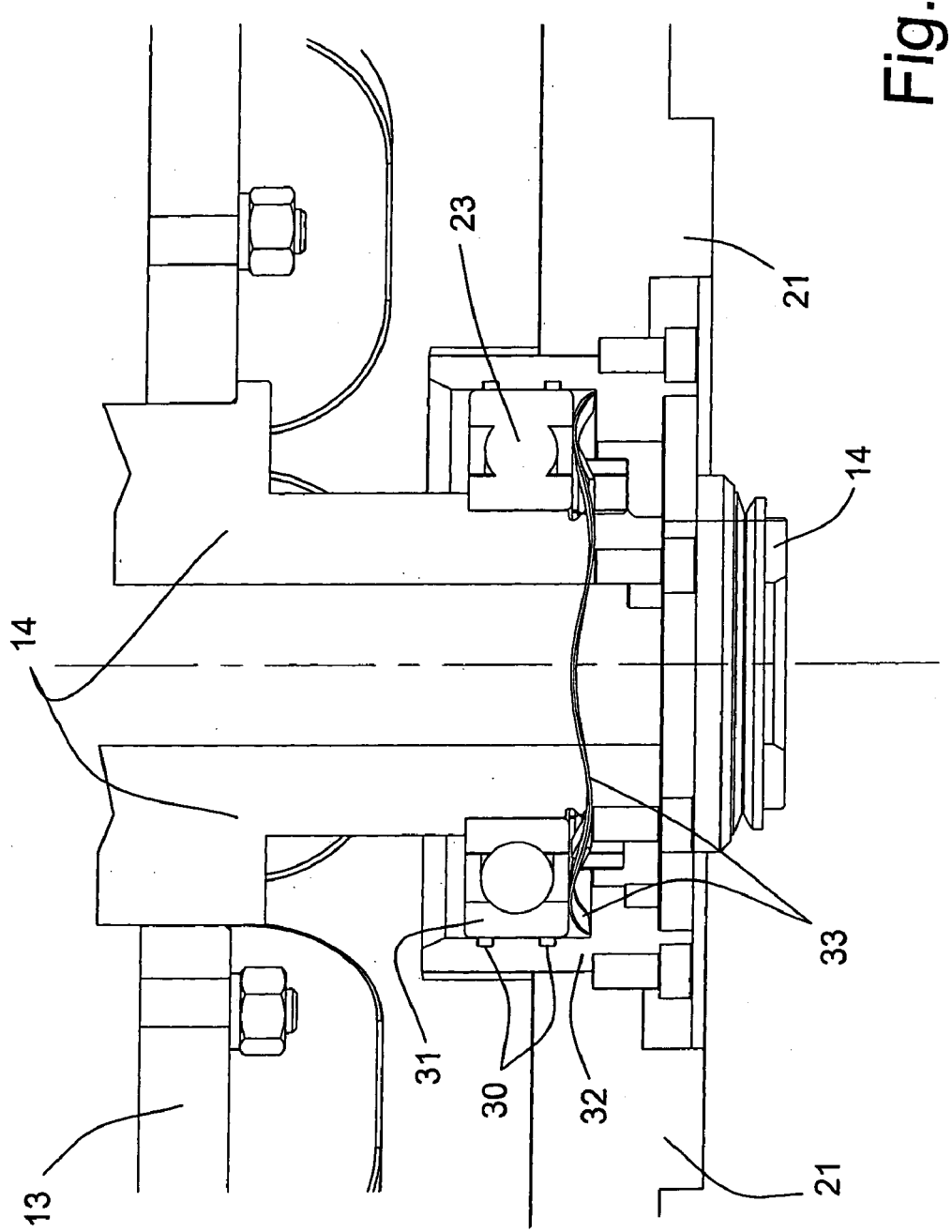
FIG. 9 is a partial cross-sectional view of the bottom bearing illustrating the full side view of the wave spring.
Figure 10:
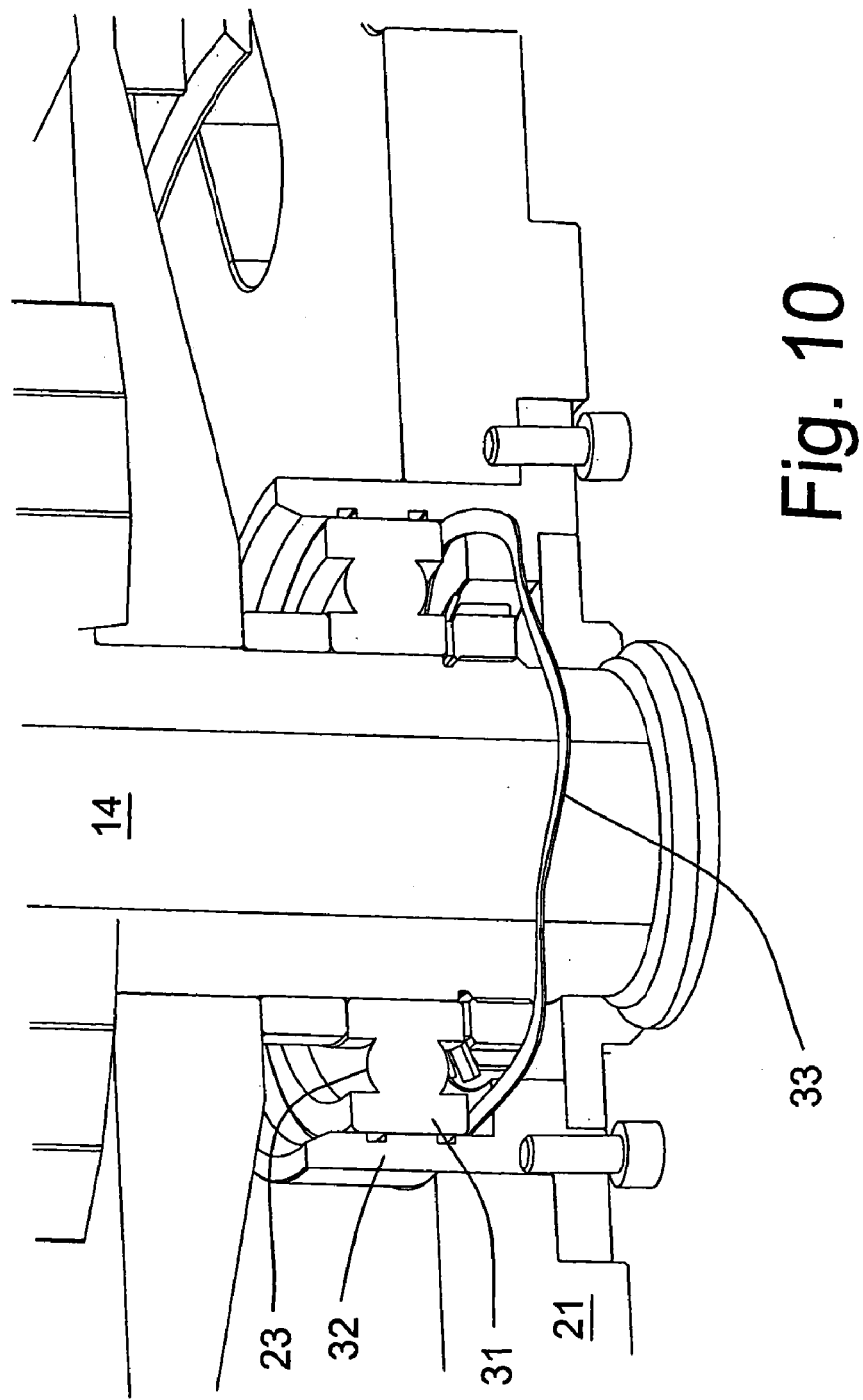
FIG. 10 is a perspective view of a partial cross-section of the bottom bearing according to FIG. 9.

With reference to FIGS. 9 and 10, in a second mounting assembly, the bottom bearing 23 is also provided with some compliance aided with some radial or transverse tolerance being provided and being fit with circumferential O-rings 30 to retain sealing without restricting movement. The bottom bearing is a ball bearing which supports radial loads. The outer race 31 of the bottom ball bearing 23 has some radial clearance to a bearing mount 32 supported in the bottom plate 21 so as to enable some radial or transverse misalignment of the shaft 14 and bottom plate 21. The outer race 31 is therefore not conventionally firmly restrained and thus is additionally pre-loaded with a wave spring 33.

With reference once again to FIG. 7, a rotor position encoder 80 is provided in the bearing housing 24 for sensing rotor position for feed back to the SRM controller 11$c$.

Lubrication Embodiment

Returning to FIGS. 6, 7 and 8 in another embodiment, the upper bearing 22 is provided with a dependable supply of lubricant such as oil. In the spherical bearing embodiment disclosed, dynamic operation of the bearing 22 has a tendency to shed its own lubricating oil radially outwardly. The upper bearing has an outer and lower race supported on the upper plate 20. The upper bearing has an upper race supportably and coupled for co-rotation with the shaft 14. An inner annulus area 35 within the lower race of the spherical bearing is placed in communication with an annular oil reservoir 36 radially outward of the spherical bearing. Typically the oil reservoir 36 is formed between the bearing housing 24 and the upper bearing 22. Oil shed radially outwardly by the bearing 22 is collected in a sump of the oil reservoir 36 and directed through passages 37 below the outer race, such as through a race mounting block, and back to replenish the inner annular area 35. Oil is retained in the upper spherical bearing housing 34, and loss down the hollow shaft is prevented, using a standpipe 38 sealably secured to the upper plate 20 below the spherical bearing 22 and extending upwardly through the bearing and around the shaft 14. The upper race of the upper bearing 22 is coupled to the shaft above the standpipe 38.

A bearing hold down retainer 40 is secured by a nut 41 to the shaft 14. The retainer 40 is fit with passages 42 for release of potential pressure buildup or flow of gases.

Cooling Embodiment A

Induced heat, which can build up and cause premature failure of conventional SRM technology under such rigorous operating conditions, is effectively dissipated under another embodiment of the improved top drive 1. In this preferred embodiment, ambient air is circulated from outside the SRM 11, into the motor and across the stator 12 and rotor 13.

With reference to FIG. 6–24, the flow path of the cooling air is through cooling air passages formed through a combination of unique stator and rotor design features.

Simplistically, air is conducted through passages in the stator 12 or laminate stack to remove heat generated by the motor. The air can be directed axially through the stator or radially therethrough.

Figure 11:
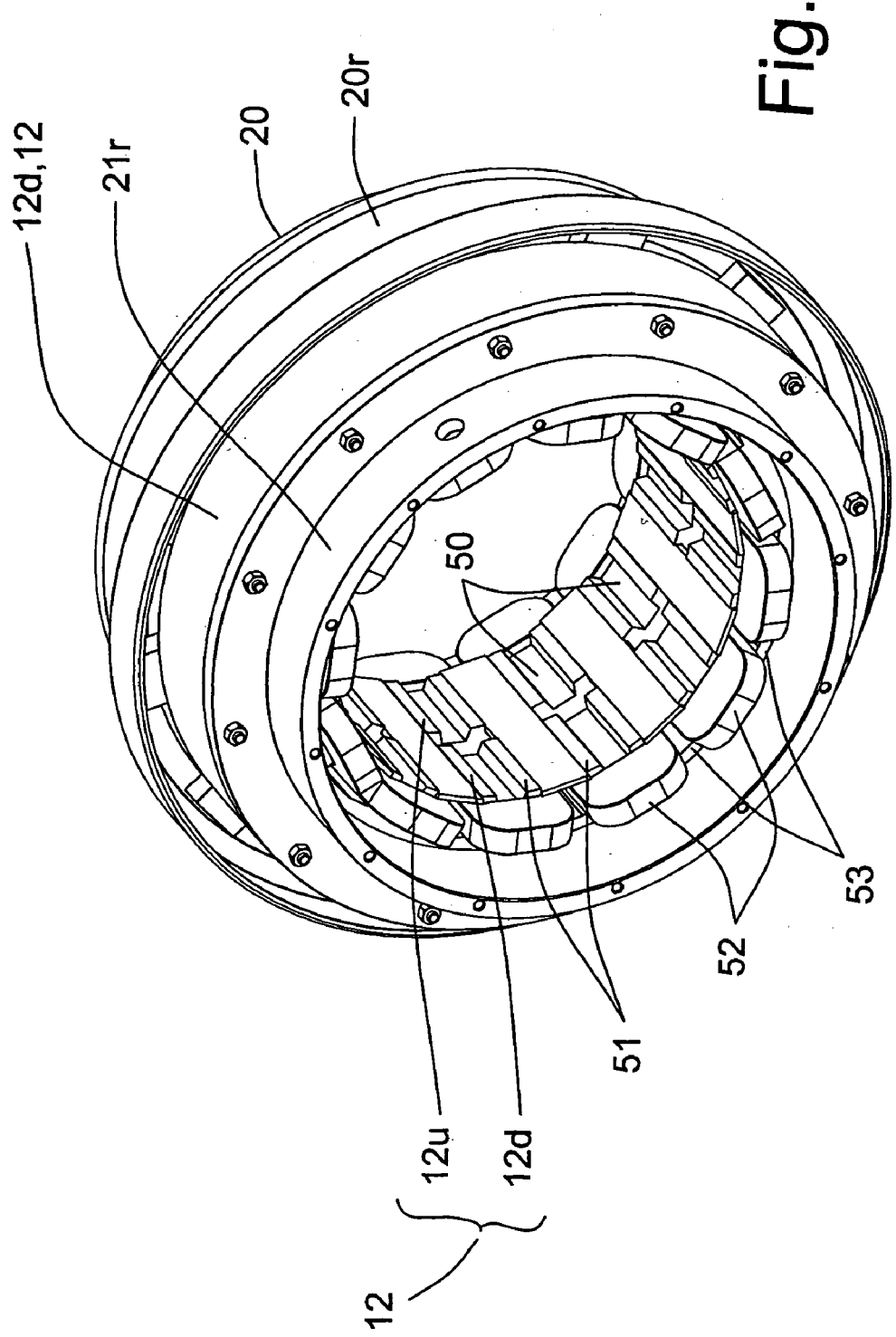
FIG. 11 is an underside perspective view of the stator illustrating the upper and bottom stator lamination stacks and cooling shroud discharge.
Figure 12:
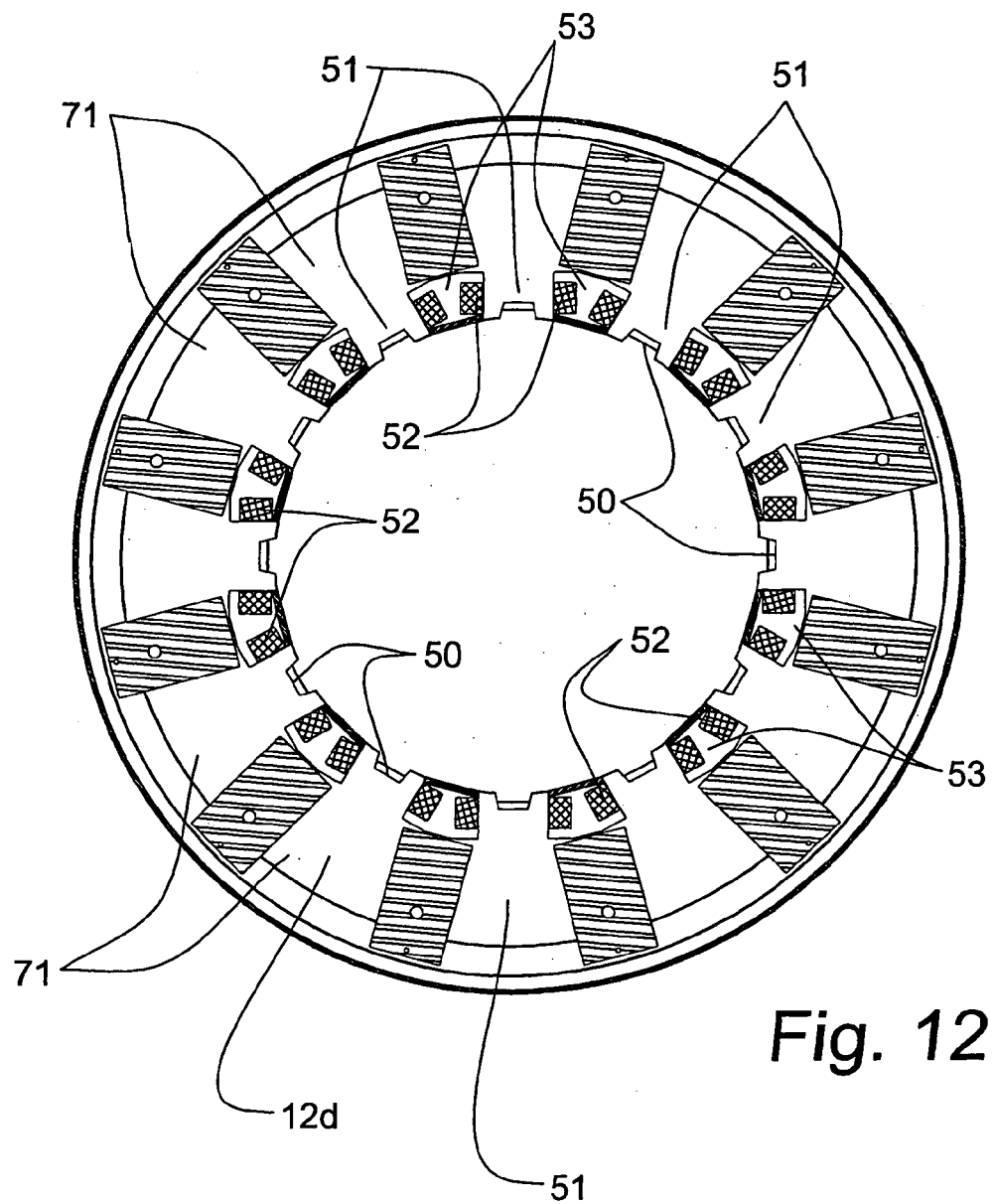
FIG. 12 is a cross-sectional view of the stator cut with the upper stator lamination stack removed to illustrate the stack spacers and illustrate cooling air discharge paths.

In one embodiment, the air is directed upwardly through spaces between adjacent coils wound on adjacent stator poles and through an array of axially-extending passages formed in the rotor 13. With reference to FIGS. 11 and 12, the stator 12 is fit with axially-extending passages 50 formed in the radially inward faces of the poles 51 adjacent the air gap between the rotor and the stator. Coils 52 are wound about each pole 51 leaving some clearance therebetween forming additional pole-to-pole axially-extending passages 53 between poles 52. The passages 53 isolated from the air gap.

Figure 13:
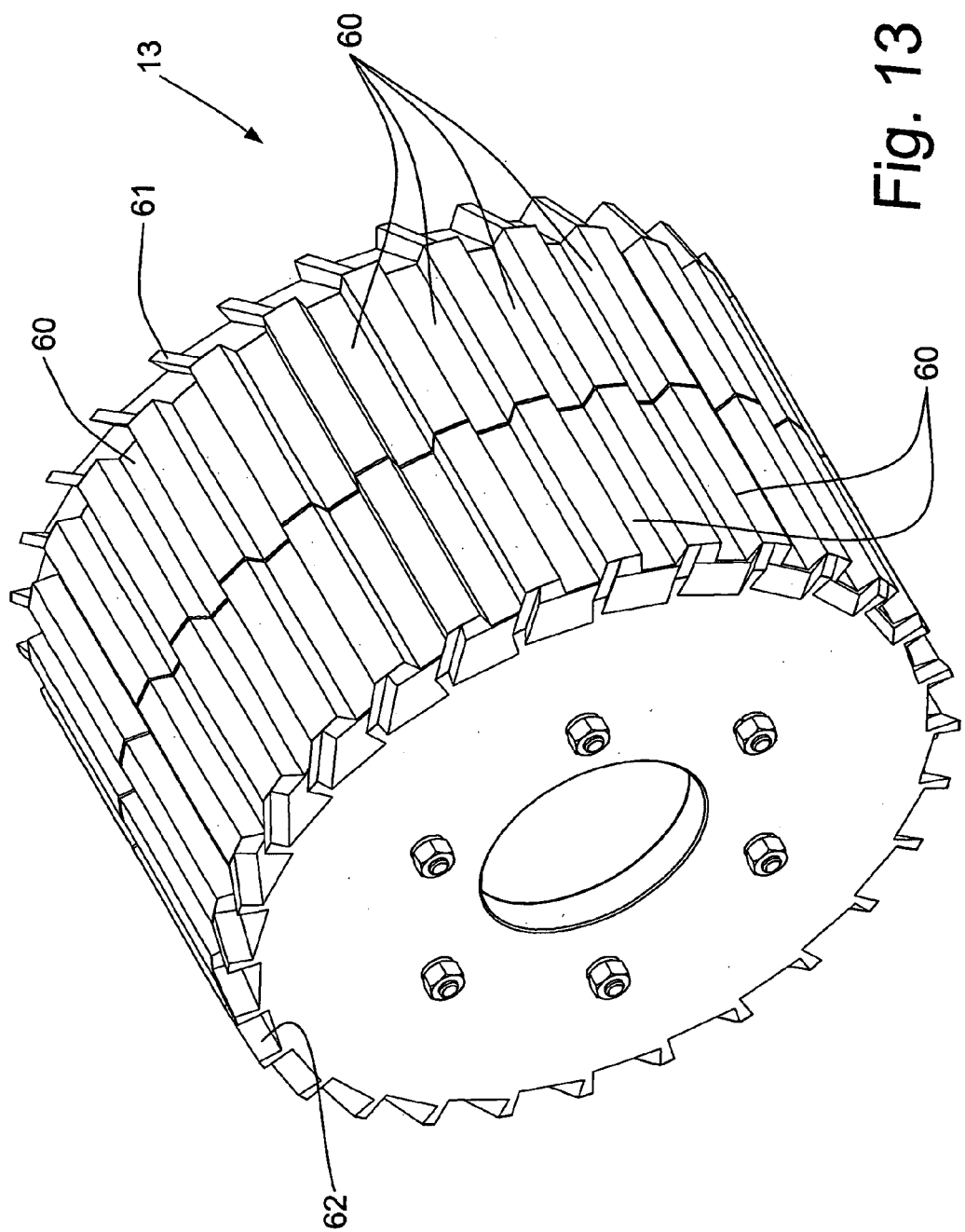
FIG. 13 is a perspective view of the rotor illustrating the cooling air vanes, axially-extending passageways and axial flow barrier.
Figure 14A:
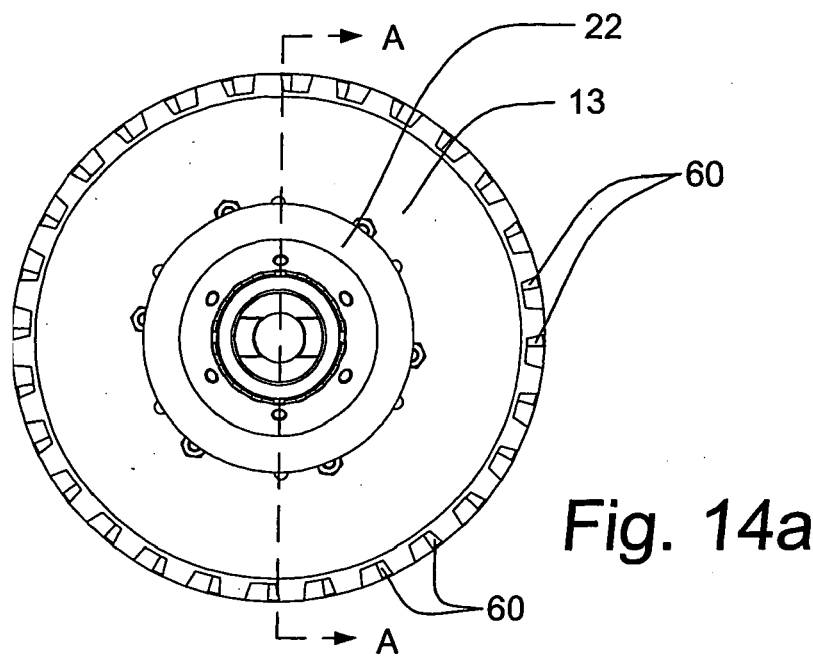
FIGS. 14a and 14b are top views and perspective views respectively of the assembled stator, hollow shaft, upper bearing and lower bearing.
Figure 14B:
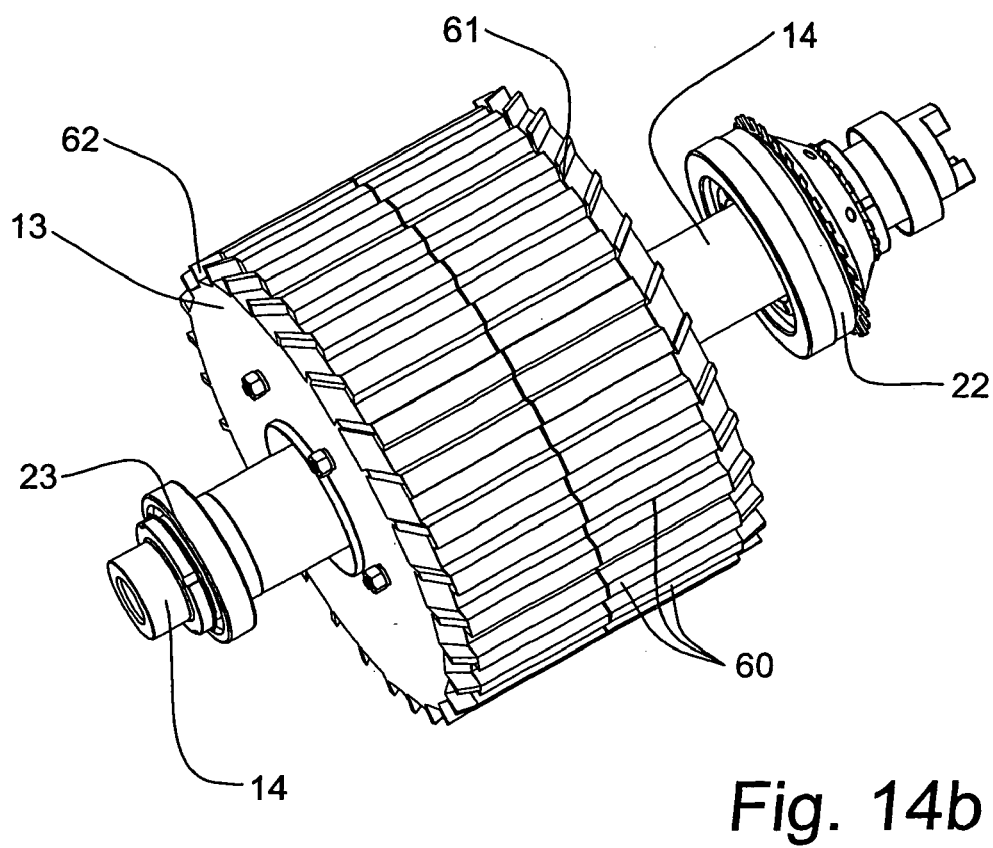

With reference to FIGS. 13–15, the lamination stack of the rotor 13 is fit with axially-extending passages 60 open to the air gap. Upper and lower air movers or vanes 61,62 aid in forcing air flow along the axially-extending passages 60 of the rotor 13 and the passages 50 the stator 12. With reference to an assembly shown in FIG. 16, the rotor 13 and stator provide a plurality of cooling, axially-extending passages 50, 60 and 53. Cooling air is drawn inwardly through ports 75 in the bottom plate 21 and is directed radially past the stator 12 and out of the motor 11.

Figure 17:
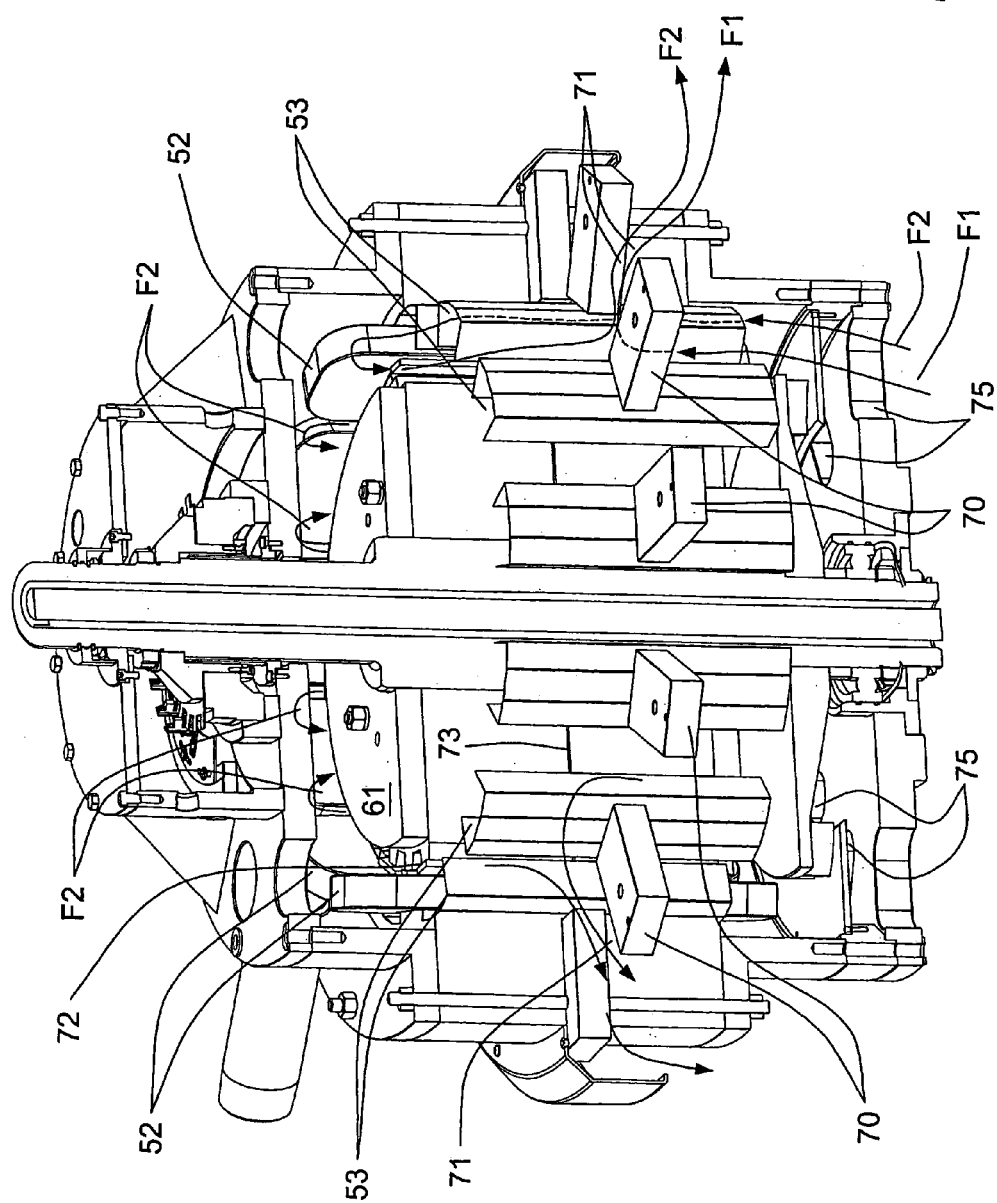
FIG. 17 is a partial perspective cross-section of the rotor and stator and illustrating air cooling flow paths.
Figure 18:
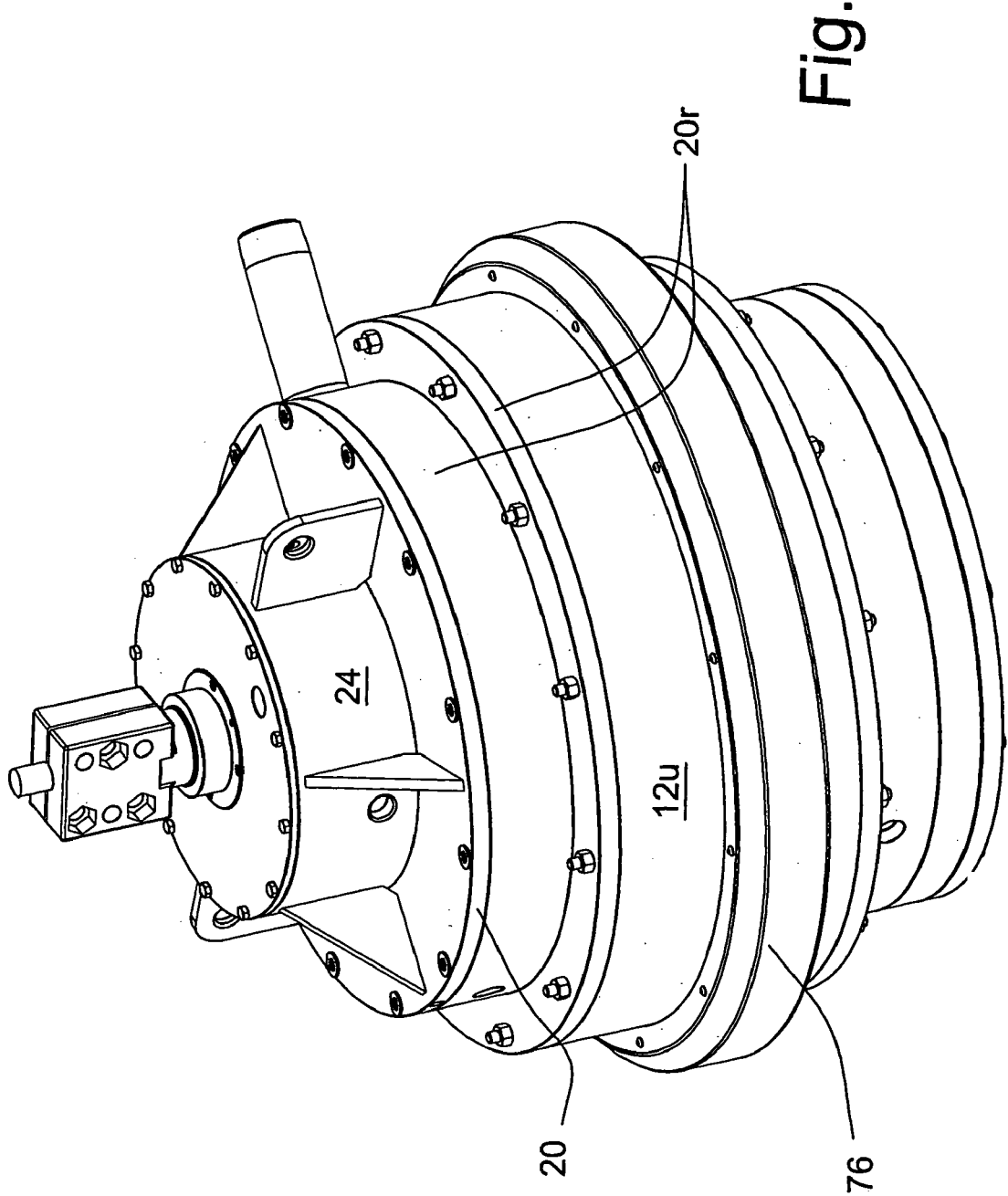
FIG. 18 is a partial perspective view of the upper plate, upper bearing housing and cooling air discharge shroud.
Figure 19:
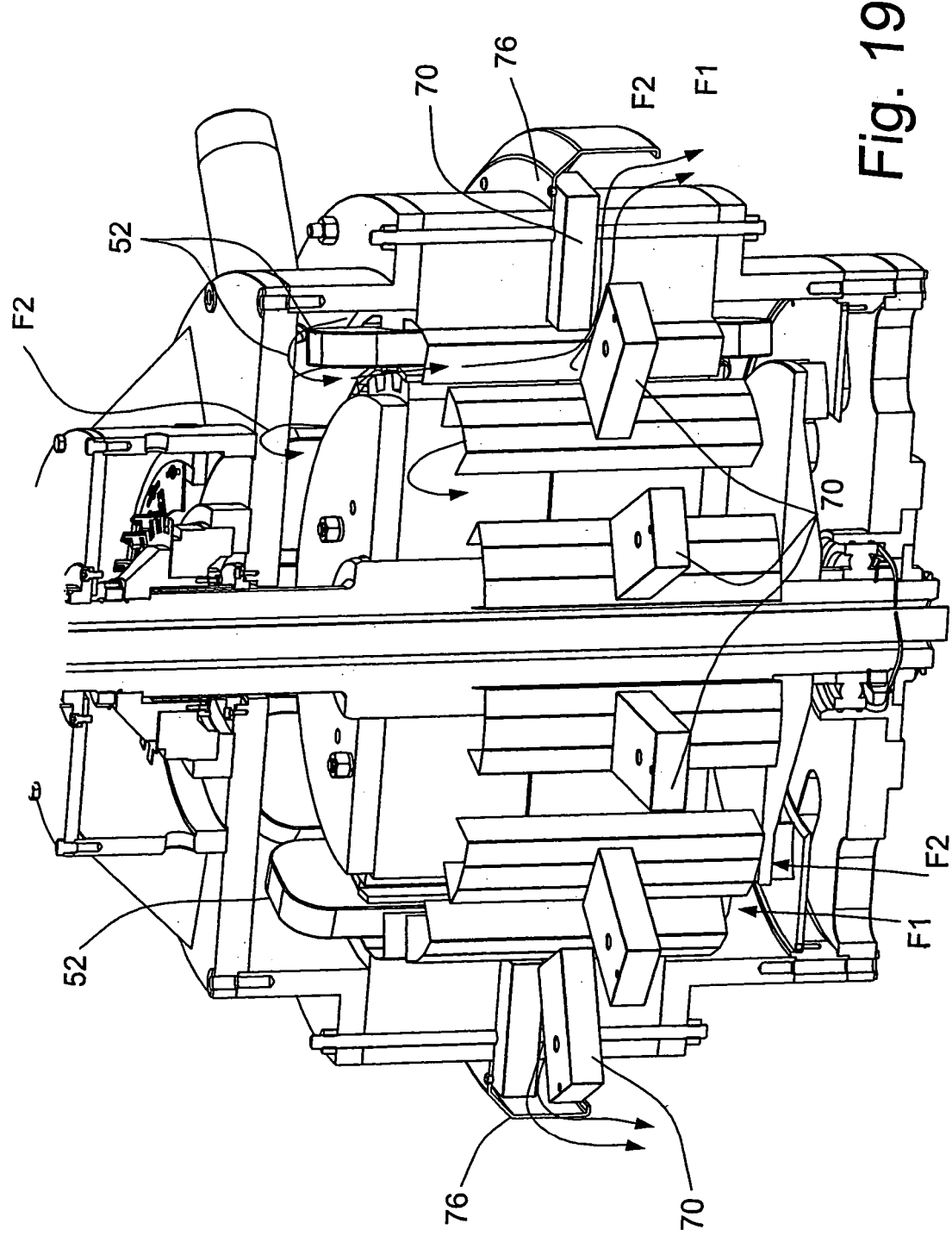
FIG. 19 is a partial cross-section perspective view of the upper plate, and cooling air discharge shroud of FIG. 18.
Figure 20:
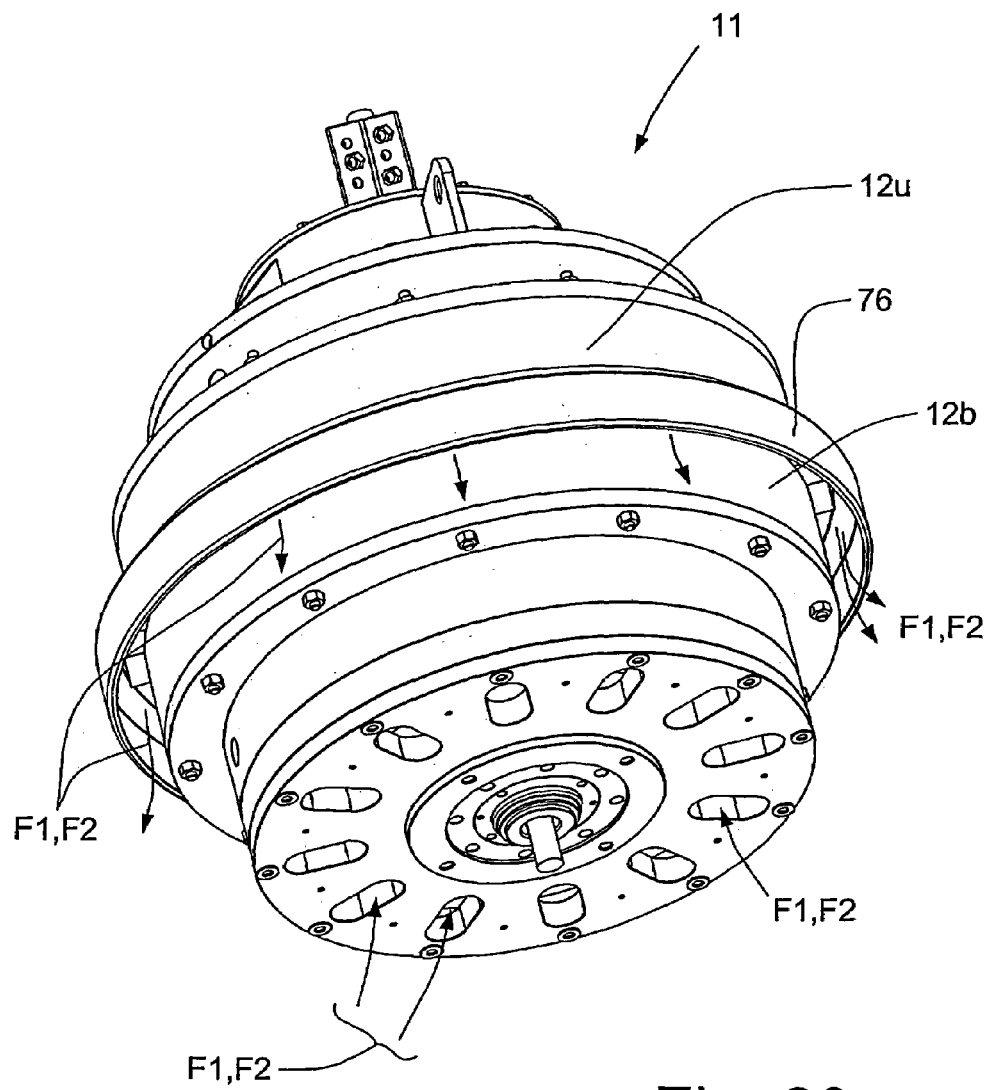
FIG. 20 is an underside perspective view of the SRM of FIG. 3 illustrating the cooling air intakes with the protective filter screen removed.
Figure 21:
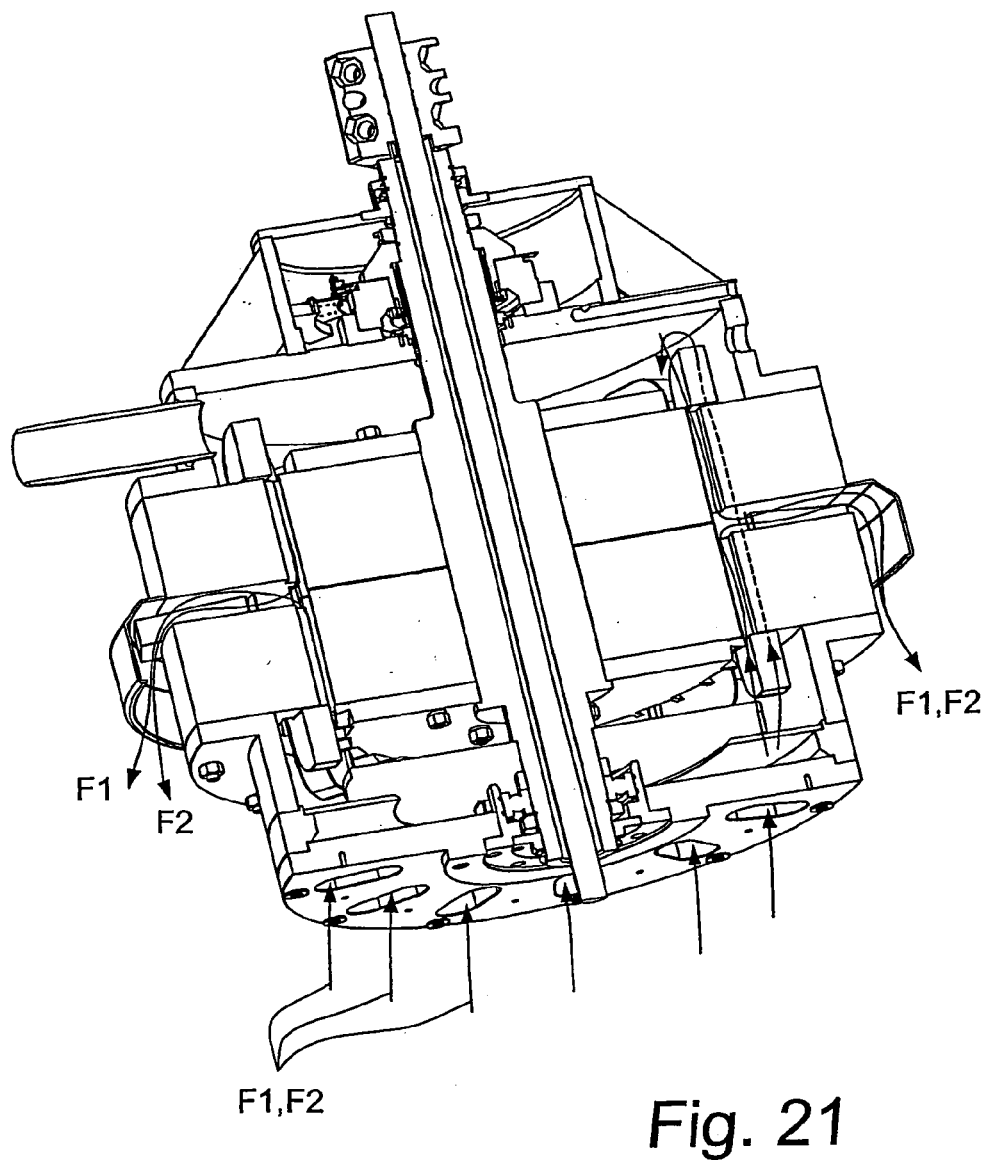
FIG. 21 is a cross-sectional perspective view of the SRM of FIG. 20 with the upper plate removed.
Figure 22:
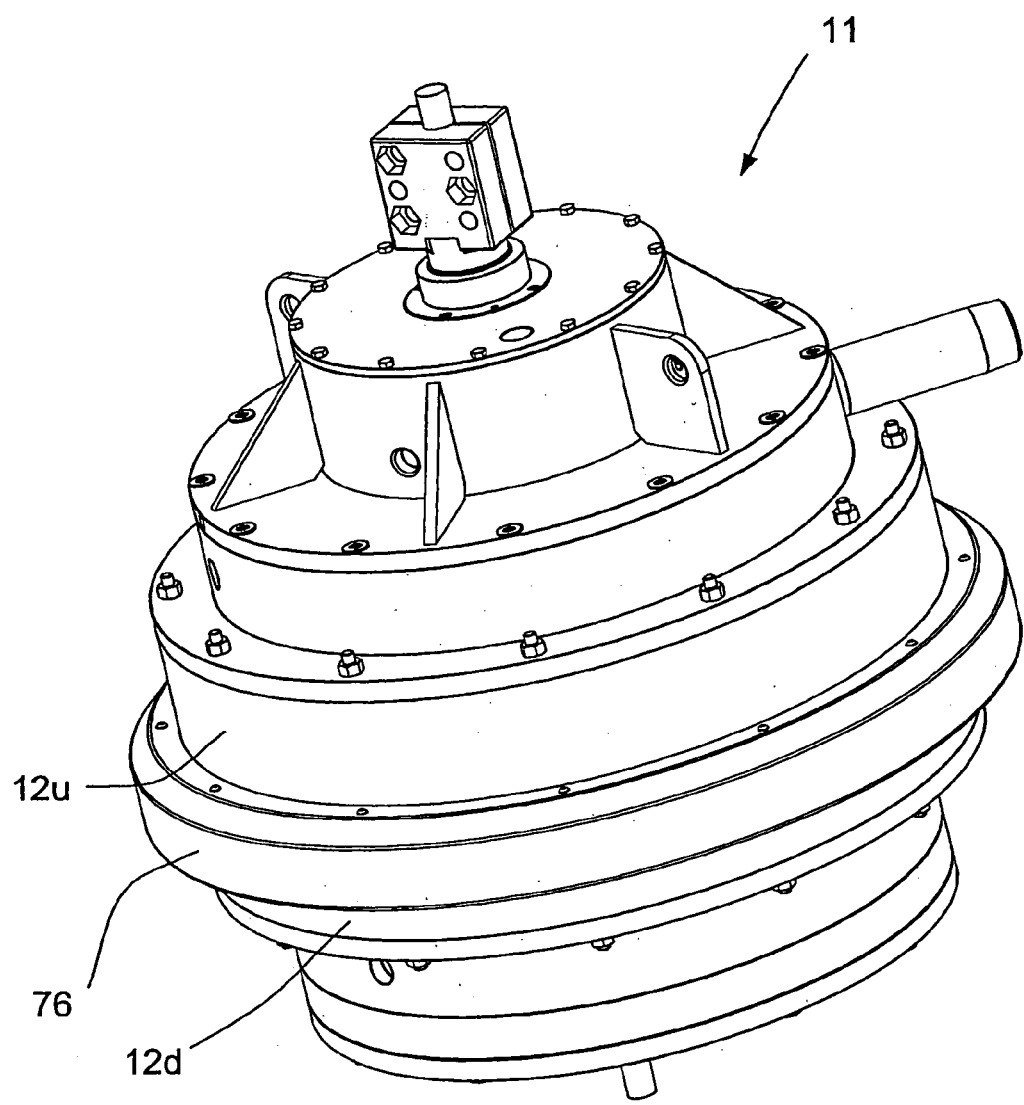
FIG. 22 is a perspective view of the SRM of FIG. 3.
Figure 23:
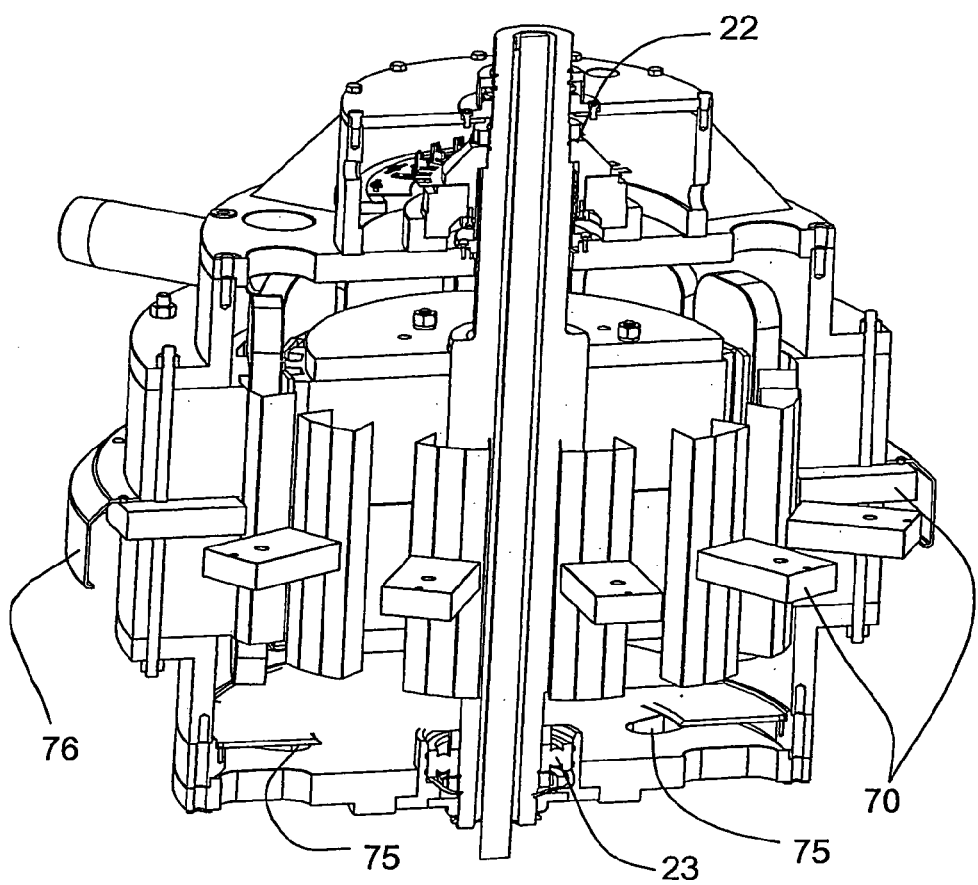
FIG. 23 is a cross-sectional perspective view of the SRM of FIG. 22 with the upper plate removed.
Figure 24:
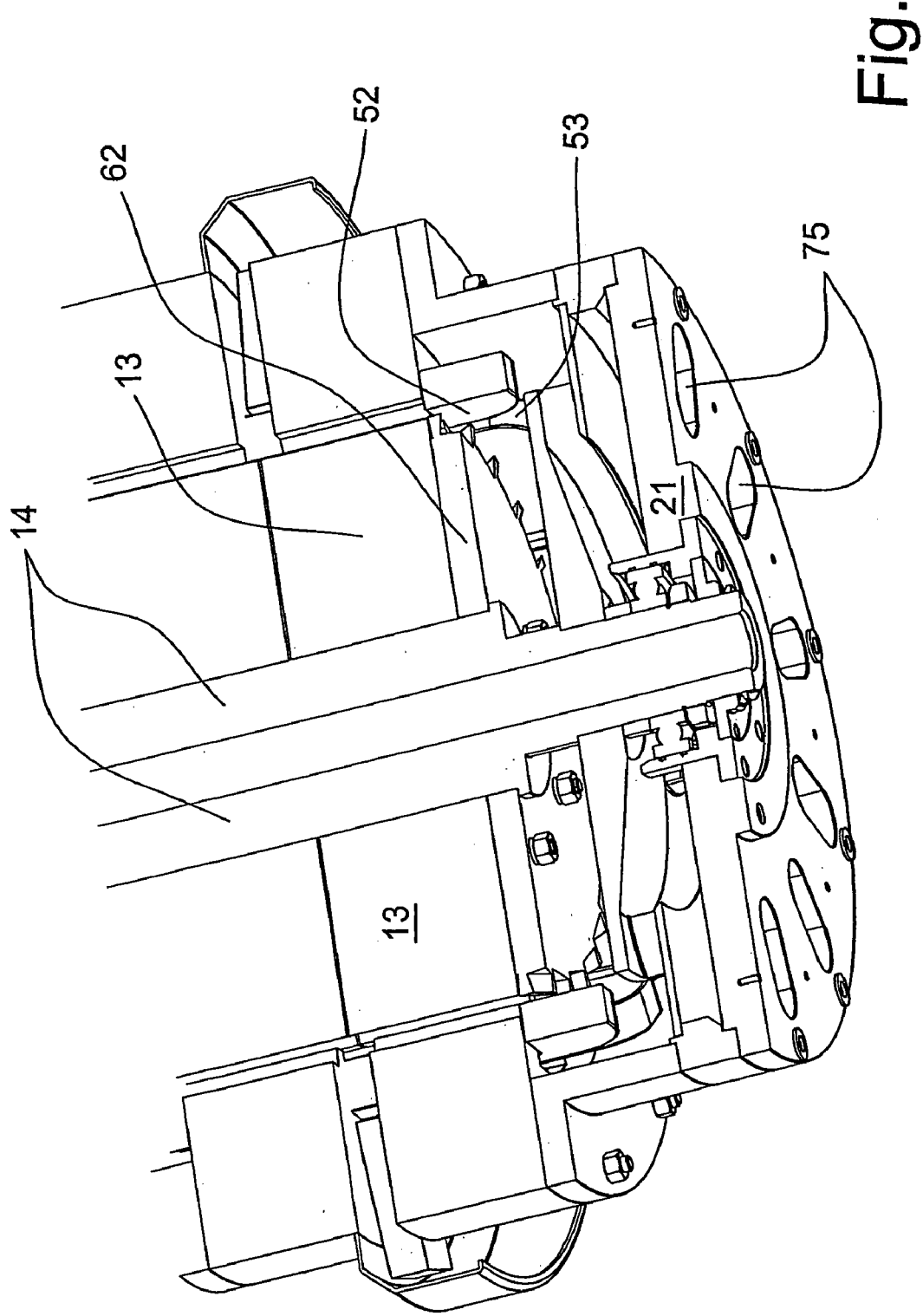
FIG. 24 is a partial underside perspective view of the SRM of FIG. 21.

With reference to FIG. 17, and as also shown in FIGS. 6,12,19,21 and 23, more preferably, the stator 12 is formed in two or more sub-stacks of stator laminations. The sub-stacks, or upper and bottom stators 12u,12b, are spaced axially by a plurality of circumferentially-spaced spacers 70. The result is a plurality of circumferentially-spaced air discharge passages 71 extending radially from the rotor-stator air gap 72 through a shroud 76 to a location outside the motor. In the case of the upper and a bottom lamination stack or stators 12u,12b, the lamination of the rotor 13 is also conveniently differentiated using a radially protruding barrier 73, typically formed of rotor laminations having a diameter larger than the axially-extending passages in the rotor 13. Air flowing along the rotor's axially-extending passages 60 are blocked and re-directed radially outwards through the discharge passages 71 between the stators 12u, 12b.

Thus, in the spaced stator embodiment, two flow paths F1, F2 are created; a first path F1 flowing upwardly from lower rotor vanes 62 and through the rotor's axially-extending passages to cool the lower lamination stack 12d, coils 52 and rotor 13, and a second path F2 flowing downwardly from upper rotor vanes 61 and through the rotor's axially-extending passages to cool the upper lamination stack 12u, coils and rotor. Both flows F1, F2 approach the rotor's protruding barrier 73 and are directed out of the motor 11. Air supplying the second path F2 is obtained from air flowing upwardly between the coils 52 and then is directed downwardly aided by the upper vanes 61.

Cooling Embodiment B

While the stator 12 may be constructed of low-loss or loss-less material to minimize heat generation, excessive heat may yet result. In this embodiment, a combination of low-loss electrical steel, a modified cross-section for the stator having cooling passages, and forced-cooling is implemented.

Figure 25:
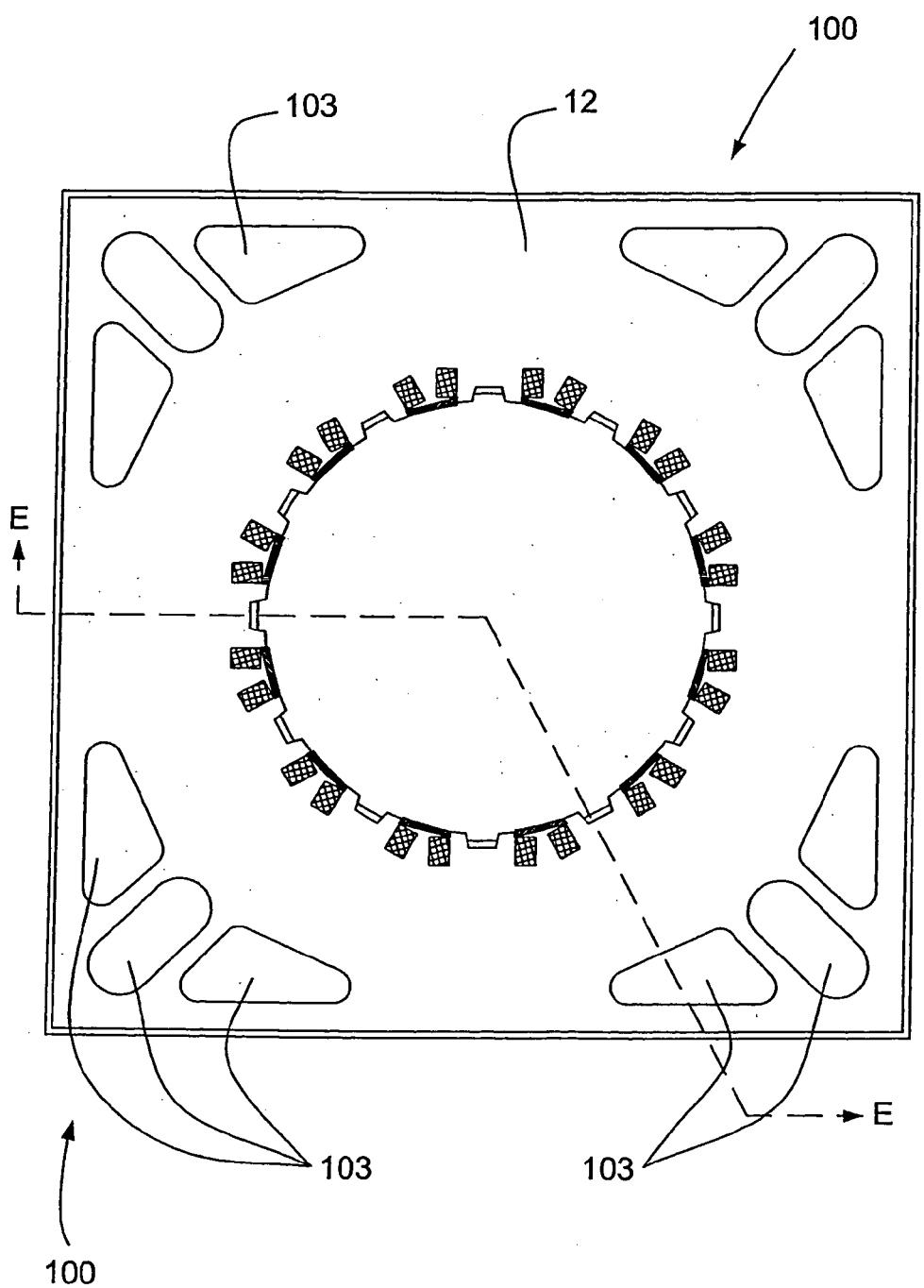
FIG. 25 is a cross-sectional view of another embodiment of the stator to illustrate the alternate body and cooling passages.
Figure 26:
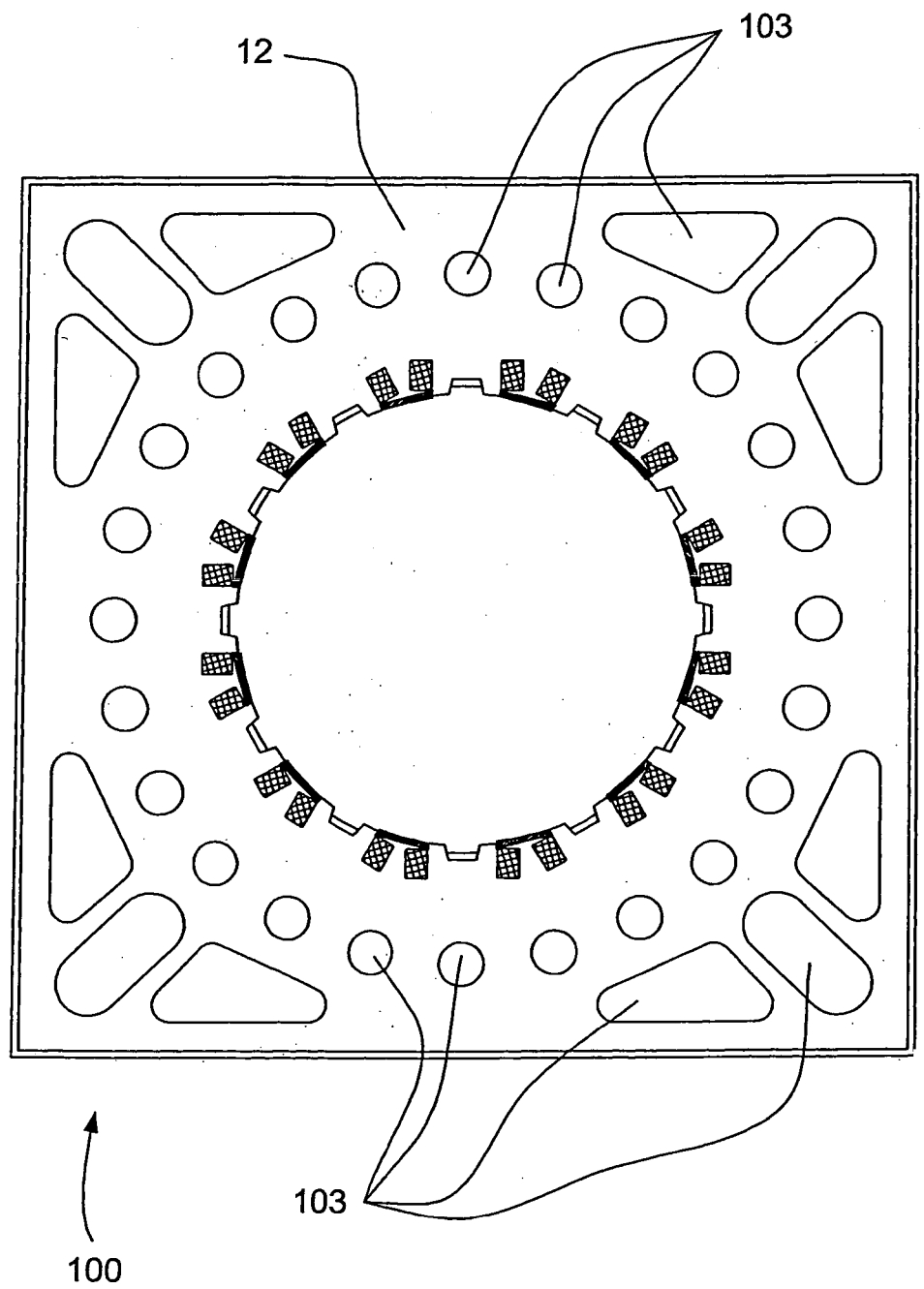
FIG. 26 is a cross-sectional view of another embodiment of the stator of FIG. 25 illustrating additional cooling passages.

With reference to FIGS. 25 and 26, a stator for the SRM can optionally comprise a laminate stack of rectangular electrical steel. Preferably, heating due to energy loss in the magnetization cycles is minimized through the use of non-oriented, high silica electrical steels such as 0.014 inch gauge ASTM 36F155/AISI 29 M19. The nominal properties of M19 electrical steel includes a maximum core loss Pc of 1.74 W/lb and resistivity of 45–55 mW cm. This is contrast to conventional motors having 0.025 inch gauge ASTM 64F275/AISI 24 M25 electrical steel having a maximum core loss Pc of 2.75 W/lb and resistivity of 20–30 mW cm.

As shown in FIG. 25 the stator 12 can have a radially-extending outer profile which exceeds that required from electrical operation of the motor. In one embodiment, the profile can be square. Using a square profile, economic savings can be realized due to the user of a full or smaller mill sheets for obtaining multiple stator core plates with less manufacturing waste and cutting. The resulting laminate stack sheets have corner mass 100 which do not participate substantially in the magnetic properties of performance of the SRM but do provide significant cooling mass without increasing the cross-sectional space requirements for the motor overall. An air mover 101, such as a fan driven by the hollow shaft 14 and shroud 102, directs cooling air though cooling passages 103 positioned through the corner mass.

As shown in FIGS. 25 and 26, a plurality of axial air passages 103 are formed axially through the stator 12, limited to the corners 100 or distributed about the stator respectively.

Figure 27:
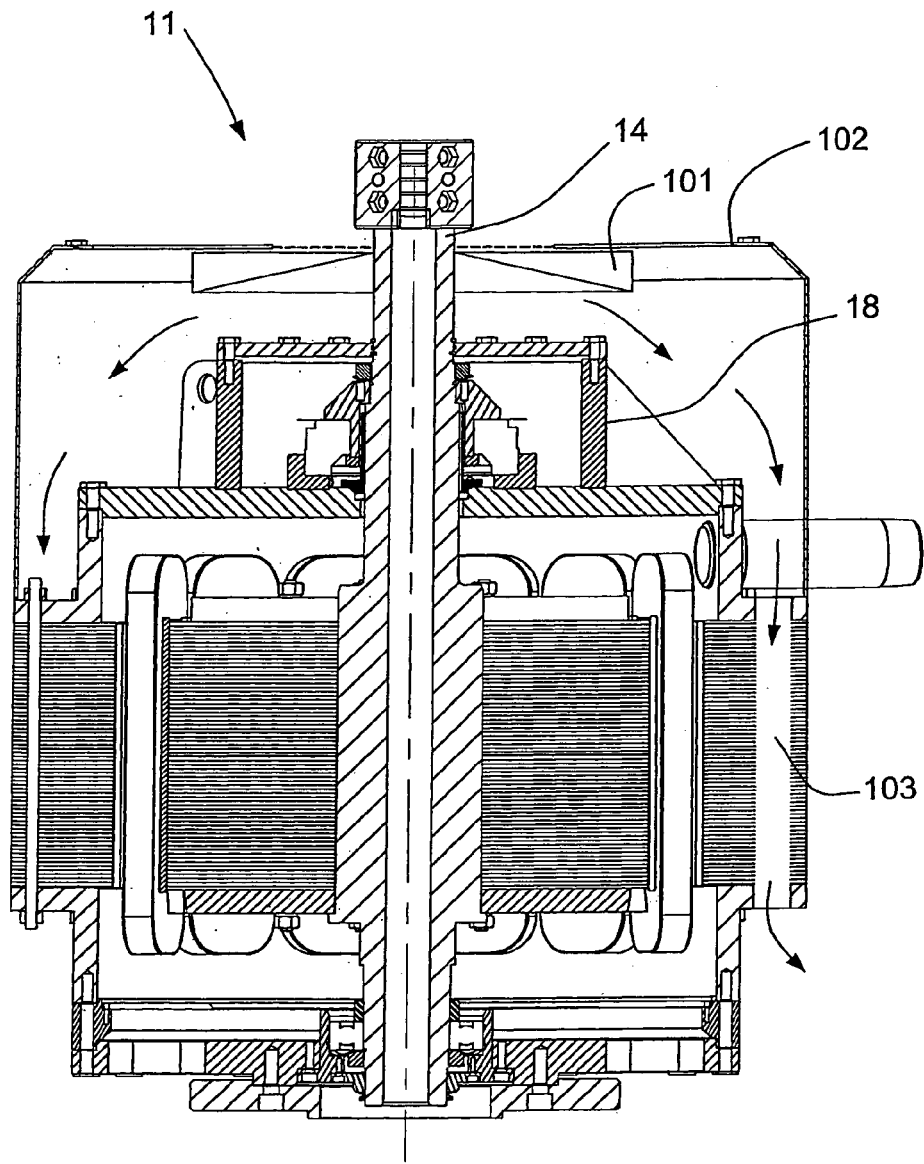
FIG. 27 is a detailed cross-sectional view of the SRM of FIG. 25 along lines E—E illustrating an embodiment of an air mover and cooling air flow though the stator.

With reference to FIG. 27, the air mover 101 is coupled for co-rotation with the shaft 14 adjacent and above the upper housing 18. The shroud 102 is positioned to sandwich the air mover 101 between the shroud 102 and the upper housing 18. The air mover 101 draws cooling air into the shroud 102 for flow through the air passages 103 and to a location external to the motor 11.

Figure 28:
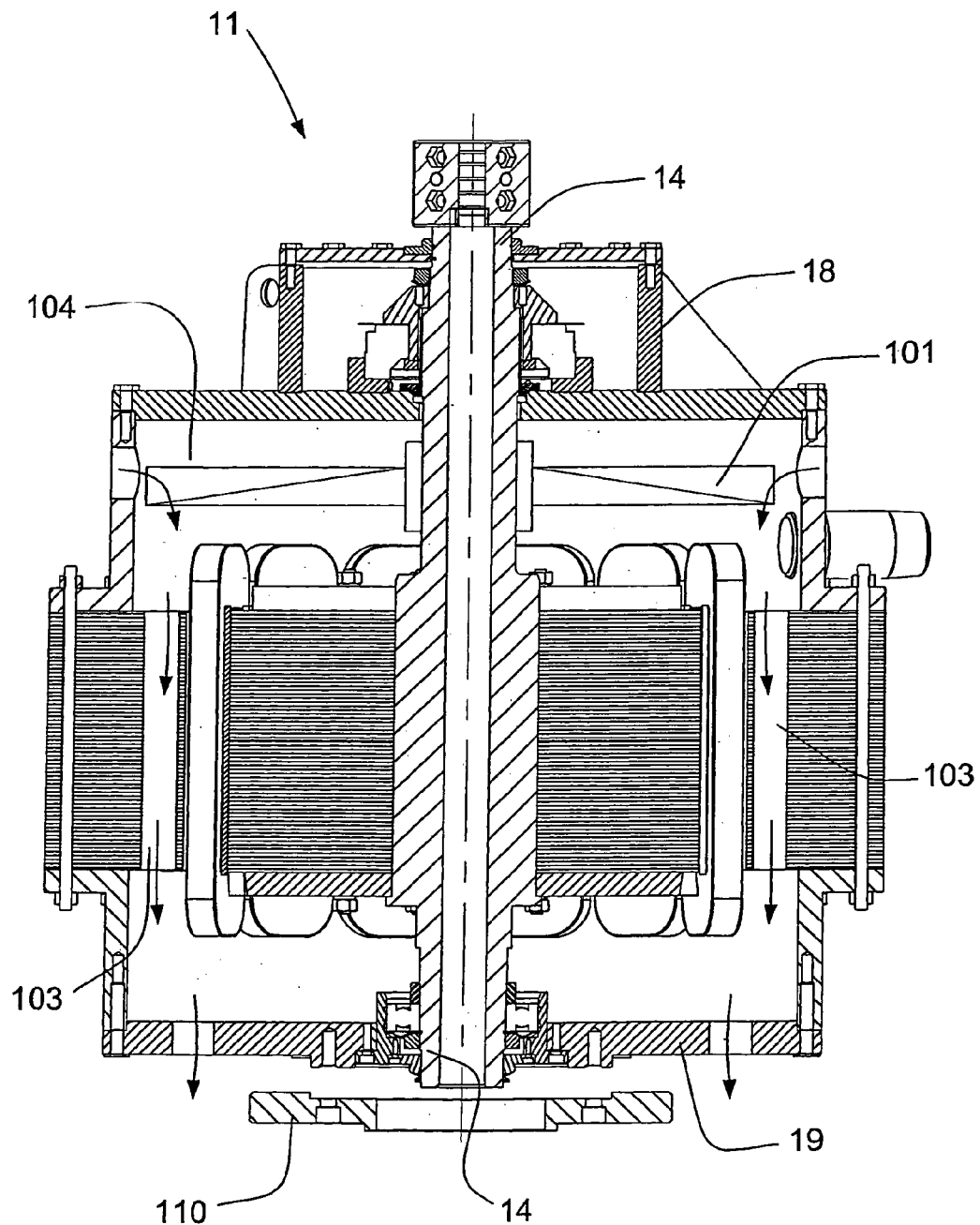
FIG. 28 is an alternate embodiment of the detailed cross-sectional view of the SRM of FIG. 25 illustrating an alternate arrangement of air mover and cooling air flow though the stator.

In another embodiment shown in FIG. 28, the air mover 101 is sandwiched between the upper housing 18 and the stator. The upper housing 18 forms the shroud 102. The air mover 101 positioned within a first annular space 104 within the upper housing and is coupled for co-rotation with the shaft 14. The fan draws cooling air into the shroud 18,102 for flow through the air passages 103 and to a location external to the motor 11.

It is preferable to protect the motor 11 from accidental damage by recessing the shaft 14 within the lower housing 19. Should the shaft 14 protrude (as shown in FIG. 28), then a further or additional plate 110 is installed or the lower housing 19 is modified to recess the shaft 14 therein.

As a result of the novel combination of the present invention, certain advantages are obtained:

very low rotational speed capability—including less than 100 rpm high starting torque and a substantially flat torque curve;

minimal components;

use of a concentric shaft and rod string and elimination of speed-reduction for providing passive and safe response to backspin situations;

use of a frameless motor configuration capable of supporting full axial loads;

a bearing arrangement is tolerant of misalignment in the motor or the polish rod; and elimination of the need for additional mechanical or hydraulic backspin prevention devices.

What is claimed is:

1. A frameless switched reluctance motor supported on a motor support, the motor having a stator and having a rotor forming an air gap therebetween, the rotor supported on a shaft disposed along an axis through the stator for rotatably transferring axial loads therealong, the motor comprising:

a lamination stack for the stator, the stator's lamination stack having a first end and a second end;

a first bearing located adjacent the first end of the stator's lamination stack for supporting the shaft and rotor axially and radially within the stator;

a first housing having a peripheral first flange bearing upon the first end of the stator's lamination stack and an upper plate spaced from the first flange by a structural member, the upper plate supporting the first bearing for transference of axial loads through the first housing to the stator's lamination stack;

a second bearing located adjacent the second end of the stator's lamination stack for supporting the shaft at least radially within the stator; and a second housing having a peripheral second flange connected to the second end of the stator's lamination stack and a second plate spaced from the second flange by a structural member, the second plate supporting the second bearing and adapted for connection to the motor support for transference of vertical loads from the second housing and stator's lamination stack.

2. The motor of claim 1 wherein the axis of the shaft is normally perpendicular from the first plate, the first bearing being supported on the first plate and wherein an axis of the first bearing aligns with the axis of the shaft despite misalignment of the shaft and the first plate.

3. The motor of claim 1 wherein the first bearing is a self-aligning thrust bearing.

4. The motor of claim 1 wherein an axis of the second bearing shifts transversely to align with the axis of the shaft.

5. The motor of claim 4 further comprising:

a first mounting assembly connected to the first plate for supporting the first bearing along the axis of the shaft; and a second mounting assembly connected to the second plate for supporting the second bearing along the axis of the shaft.

6. The motor of claim 5 wherein the second mounting assembly enables transverse movement of the second bearing therein.

7. The motor of claim 5 wherein the first mounting assembly further comprises a first bearing housing for sealing the first bearing and being structurally secured to the first plate to strengthen the first plate to resist deflection under the axial loads.

8. The motor of claim 1 wherein the shaft is oriented vertically, the first housing being an upper housing and the second housing being a lower housing, the lower housing being adapted for support on a motor support, the axial loads being transferred from the shaft to the first bearing and to the upper housing, the stator's lamination stack, and the lower housing.

9. The motor of claim 8 further comprising:

a first bearing housing structurally secured to the upper plate to protect the first bearing and to strengthen the upper plate to resist deflection under the axial loads, the first bearing having an outer and lower bearing race supported on the upper plate and an upper race supportably connected for rotation with the shaft;

an inner annulus area formed between said outer bearing race and the shaft;

an annular oil reservoir between the first bearing housing and the outer bearing race; and an oil passage between the inner annulus area and the annular oil reservoir for gravity flow of oil therebetween, wherein oil shed radially outwardly from the first bearing is collected in the annular oil reservoir and flows back to the inner annular area.

10. The motor of claim 9 further comprising a tubular standpipe sealingly mounted to the upper plate for retaining oil between the inner annulus area and the standpipe between said outer bearing race and the shaft and wherein the upper race is supportably connected to the shaft above the tubular standpipe.

11. The motor of claim 1 wherein:

the rotor further comprises:

a plurality of circumferentially-spaced and axially extending rotor air passages formed along the air gap, at least one air mover for rotation with the rotor for inducing movement of air along the rotor air passages; and wherein the stator's lamination stack is divided intermediate along the axis and further comprises an upper stack and a lower stack having one or more circumferentially-spaced spacers for supportably spacing the upper stack from the lower stack and forming a plurality of radially-extending circumferentially-spaced air discharge passages extending through the stator's lamination stack to a location external to the motor, wherein air flows along the rotor and through the circumferentially-spaced air discharge passages to cool the motor.

12. The motor of claim 11 wherein the rotor further comprises:

a radially extending air flow barrier positioned intermediate along the rotor and dividing the rotor air passages into upper and lower rotor air passages, the air flow barrier being positioned substantially adjacent the circumferentially-spaced air discharge passages extending through the stator's lamination stack; and a first air mover at a first end of the rotor for flowing air from the rotor's first end to the air flow barrier and out of the motor through the stator's lamination stack through the circumferentially-spaced air discharge passages; and a second air mover at a second end of the rotor for flowing air from the rotor's second end to the air flow barrier and out of the motor through the stator's lamination stack through the circumferentially-spaced air discharge passages.

13. The motor of claim 12 further comprising a cooling air port in one of the first or second housings; and wherein the stator's lamination stack further comprises a plurality of circumferentially-spaced and axially extending air passages formed in the stator adjacent the air gap between the stator and the rotor and isolated therefrom for distributing air between the first and second air movers.

14. The motor of claim 1 wherein:

the stator's lamination stack further comprises a plurality of axially-extending circumferentially-spaced stator air discharge passages extending through the stator's lamination stack to a location external to the motor; and at least one air mover for co-rotation with the shaft; and a shroud for inducing movement of cooling air from the at least one air mover and along the stator air discharge passages.

15. The motor of claim 14 wherein the stator's lamination stack has a radially-extending outer profile which exceeds that required for electrical operation of the stator and the rotor and wherein the stator air discharge passages extend through the outer profile.

16. The motor of claim 14 wherein:

the at least one air mover is located adjacent the first housing for co-rotation with the shaft; and the shroud is positioned for sandwiching the at least one air mover between the first housing and the shroud for inducing movement of cooling air into the stator air discharge passages.

17. The motor of claim 14 wherein:
- the shroud comprises the first housing forming a first annular space about the shaft and between the first bearing and the first plate;
- the stator's lamination stack further comprises a plurality of axially-extending circumferentially-spaced stator air discharge passages extending through the stator's lamination stack to a location external to the motor; and
- the at least one air mover is located in the first annular space for co-rotation with the shaft for inducing movement of cooling air along the stator air discharge passages.

18. A top drive for driving a downhole rotary pump and a rotary rod string, the rod string extending upwardly through a wellhead to the top drive and downwardly through a wellbore to the rotary pump, the top drive comprising the apparatus of claim 1 and the wellhead forms the motor support.

19. A top drive for driving a downhole rotary pump and a rotary rod string, the rod string extending upwardly through a wellhead to the top drive and downwardly through a wellbore to the rotary pump, the top drive comprising the apparatus of claim 8 and the wellhead forms the motor support.

20. A top drive for driving a downhole rotary pump and a rotary rod string, the rod string extending upwardly through a wellhead to the top drive and downwardly through a wellbore to the rotary pump, the top drive comprising the apparatus of claim 9 and the wellhead forms the motor support.

21. A top drive for driving a downhole rotary pump and a rotary rod string, the rod string extending upwardly through a wellhead to the top drive and downwardly through a wellbore to the rotary pump, the top drive comprising the apparatus of claim 11 and the wellhead forms the motor support.

22. A top drive for driving a downhole rotary pump and a rotary rod string, the rod string extending upwardly through a wellhead to the top drive and downwardly through a wellbore to the rotary pump, the top drive comprising the apparatus of claim 14 and the wellhead forms the motor support.

* * * * *